(12) United States Patent
Warner, IV et al.

(10) Patent No.: US 12,054,252 B2
(45) Date of Patent: Aug. 6, 2024

(54) FLIGHT-ENABLED SIGNAL BEACON

(71) Applicant: Yana SOS, Inc., Ann Arbor, MI (US)

(72) Inventors: Fredrick M. Warner, IV, Marine City, MI (US); Theodore Lavoie, Novato, CA (US); Nathan Ernst, Dexter, MI (US); Vivek Reddy Alla, Ypsilanti, MI (US); Michael Gorski, Grass Lake, MI (US); Casey Alford, Ann Arbor, MI (US); Tim VanAntwerp, Saint Joseph, MI (US); Timothy Kent, St. Clair Shores, MI (US); Donald Massey, Chicago, IL (US)

(73) Assignee: YANA SOS, INC., Ann Arbor, MI (US)

( * ) Notice: Subject to any disclaimer, the term of this patent is extended or adjusted under 35 U.S.C. 154(b) by 215 days.

(21) Appl. No.: 17/520,569

(22) Filed: Nov. 5, 2021

(65) Prior Publication Data

US 2022/0144429 A1 May 12, 2022

Related U.S. Application Data

(60) Provisional application No. 63/110,482, filed on Nov. 6, 2020.

(51) Int. Cl.
*B64C 27/39* (2006.01)
*B64C 27/57* (2006.01)
(Continued)

(52) U.S. Cl.
CPC ............ *B64C 39/024* (2013.01); *B64C 27/39* (2013.01); *B64C 27/57* (2013.01); *B64C 27/72* (2013.01);
(Continued)

(58) Field of Classification Search
CPC ......... B64C 27/39; B64C 11/28; B64C 27/40; B64C 27/50; B64C 27/10; B64C 39/02; B64C 27/72; B64D 47/02
See application file for complete search history.

(56) References Cited

U.S. PATENT DOCUMENTS

| 5,413,514 | A | * | 5/1995 | Milligan | ................ | A63H 27/12 |
| | | | | | | 446/211 |
| 6,393,989 | B1 | | 5/2002 | Weimer | | |

(Continued)

FOREIGN PATENT DOCUMENTS

| WO | WO-2017173502 A1 | * | 10/2017 | | |
| WO | 2019137146 A1 | | 7/2019 | | |
| WO | WO-2019137146 A1 | * | 7/2019 | ............. | B64C 27/10 |

OTHER PUBLICATIONS

Lite Machines, product description of "Voyeur," Retrieved online on Jan. 13, 2022 at: https://litemachines.com/voyeur, 1 page.
(Continued)

*Primary Examiner* — Assres H Woldemaryam
*Assistant Examiner* — Anna L. Gordon
(74) *Attorney, Agent, or Firm* — Aurora Consulting LLC; Ashley Sloat; Ty F. Davis

(57) ABSTRACT

Devices and methods for activating a flight-enable beacon configured to provide a light beacon or data signal comprising capability to establish and maintain a fixed set of coordinates. The flight-enabled beacon is configured with a processor, memory, motor, gimbal or swashplate and light emitting source and can be configured to attain and maintain a target altitude and emit a light over a fixed period of time. The flight-enabled beacon is configured to be light and with small form factor for easy portable transport in cases of emergency or to provide a signal easily locatable by parties located a distance from the activated light-enabled beacon.

20 Claims, 29 Drawing Sheets

(51) Int. Cl.

| | | |
|---|---|---|
| *B64C 27/72* | (2006.01) | |
| *B64C 39/02* | (2023.01) | |
| *B64D 47/02* | (2006.01) | |
| *B64U 10/13* | (2023.01) | |
| *G01C 21/16* | (2006.01) | |
| *G01S 19/17* | (2010.01) | |
| *G01S 19/18* | (2010.01) | |
| *G05D 1/00* | (2024.01) | |
| *G06T 7/70* | (2017.01) | |
| *G08G 5/00* | (2006.01) | |

(52) U.S. Cl.
CPC ............ *B64D 47/02* (2013.01); *G01C 21/16* (2013.01); *G01S 19/17* (2013.01); *G01S 19/18* (2013.01); *G05D 1/0808* (2013.01); *G05D 1/12* (2013.01); *G06T 7/70* (2017.01); *G08G 5/0073* (2013.01); *B64U 10/13* (2023.01); *B64U 2201/10* (2023.01); *B64U 2201/20* (2023.01)

(56) References Cited

U.S. PATENT DOCUMENTS

| | | |
|---|---|---|
| 7,789,341 B2 | 9/2010 | Arlton et al. |
| 8,042,763 B2 | 10/2011 | Arlton et al. |
| 8,083,173 B2 | 12/2011 | Arlton et al. |
| 8,917,187 B2 | 12/2014 | Matte |
| 9,321,531 B1* | 4/2016 | Takayama ............ B64C 39/024 |
| 9,434,471 B2 | 9/2016 | Arlton et al. |
| 10,093,417 B2* | 10/2018 | Meringer ............... B64U 30/24 |
| 10,946,956 B2* | 3/2021 | Campbell ............... B64C 27/50 |
| 2005/0051667 A1* | 3/2005 | Arlton .............. G08B 13/19619 244/17.11 |
| 2017/0320565 A1* | 11/2017 | Gamble .................. B64C 27/39 |
| 2018/0190042 A1 | 7/2018 | Gordon et al. |
| 2022/0219814 A1* | 7/2022 | Benedict ................ B64U 80/70 |

OTHER PUBLICATIONS

Ascent Aerosystems, product description of "Spirit/Sprite II," Retrieved online on Jan. 13, 2022 at: https://ascentaerosystems.com/spirit/, 13 pages.

Product description of "Weems & Plath," Retrieved online on Jan. 13, 2022 at: https://www.westmarine.com/buy/weems-plath--sos-distress-light-electronic-flare-with-distress-flag-17466988, 8 pages.

Ocean Signal, product description of "EDF1," Retrieved online on Jan. 13, 2022 at: https://oceansignal.com/products/edf1/, 5 pages.

Dji, product description of "Phantom 4," Retrieved online on Jan. 13, 2022 at: https://www.dji.com/phantom-4, 13 pages.

Dji, product description of "Mavic Pro," Retrieved online on Jan. 13, 2022 at: https://www.dji.com/mavic, 13 pages.

SwellPro, product description of "SplashDrone 3+," Retrieved online on Jan. 13, 2022 at: https://www.swellpro.com/waterproof-splash-drone.html#/specs, 10 pages.

* cited by examiner

FLIGHT-ENABLED SIGNAL BEACON

CROSS-REFERENCE TO RELATED APPLICATIONS

This application claims the priority benefit of U.S. Provisional Patent Application Ser. No. 63/110,482, filed Nov. 6, 2020, the contents of which are herein incorporated by reference in their entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of emergency services and/or military applications, and more specifically to the field of aerial signaling. Described herein are beacon-based aerial signaling and alerting devices and methods.

BACKGROUND

The use of visual methods to signal distant parties is necessary for communication in instances where alternative means are insufficient, for example, the use of flares as emergency distress signals has existed since the 1800s. Further, the International Convention for the Safety of Life at Sea requires its member countries to carry visual signals, such as flares, on board. Emergency flares including some form of pyrotechnics and/or smoke may include hand-held flares, roadside flares, and launched flares. Launched aerial flares are generally shot from a launcher, such as a flare gun, and rise to an altitude from about 300-900 ft, burn from about 6-40 seconds, and then extinguish and descend to the ground. Since the flare is only visible for a short time, and the user cannot control the trajectory of the flare except in the upward direction, these flares are limited in their capacity to be seen by anyone within the area. In the unfortunate event when someone needs to launch an emergency flare, their limited visual ability along with their uncontrolled trajectory may not provide adequate safety measures.

What is needed, therefore, are improved signaling and emergency flares that are suitable for use in adverse and/or remote environments, such as at sea, in the mountains, or dark roadsides.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

Figure 1:
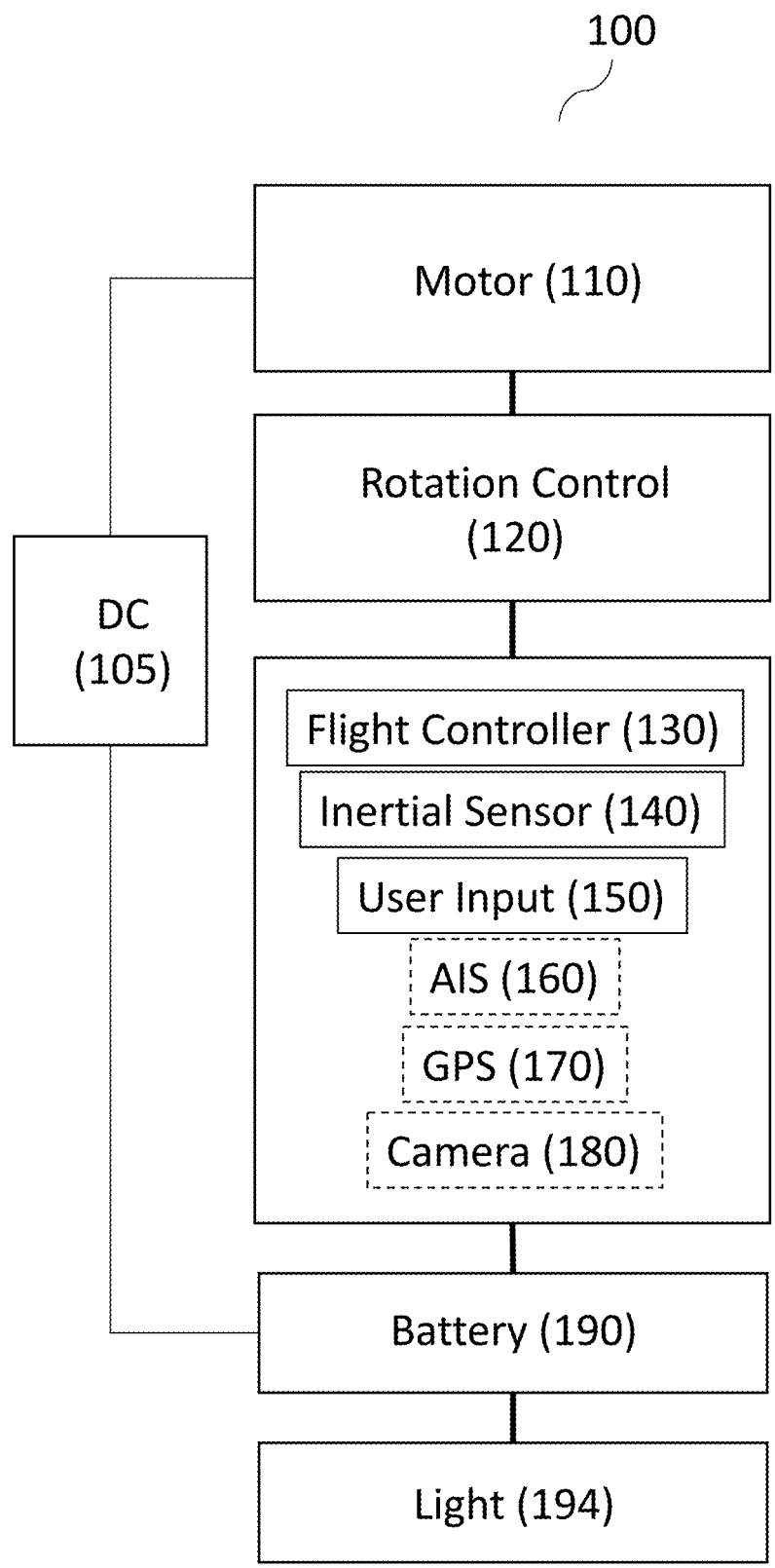
FIG. 1 is an exemplary diagram illustrating connected components for one embodiment of a flight-enabled beacon.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Described herein are devices, systems, and methods for use in marine safety, outdoor safety (e.g., hiking, biking, snowmobiling, backpacking, hunting, etc.), firefighting, first responder applications, and/or any other use case in which a beacon, light signal, or emergency signal needs to be transmitted.

Described herein are devices, systems and methods for activating and deploying a flight-enabled beacon described herein.

In general, the methods may include software-implemented means, such as processors, flight controllers, and memory, for operating the flight-enabled beacon disclosed herein.

In general, the flight-enabled beacon described herein is designed to be a portable, low-cost, lightweight, and weathertight device with controls capability to ascend and hover for a period of time in adverse weather conditions, such as those present in a man-overboard situation at sea, a fireman fighting a forest fire, or a hiker or hunter trekking through a mountainous, deserted region. In order to facilitate search and rescue operations, for example, the flight-enabled beacon is configured to fly and ascend to a target altitude while activating a light emitting source, or beacon, to signal for help. In some embodiments, the target altitude is automatic and dynamic, and a position of the flight-enabled beacon at the target altitude may be based on one or more of: GPS coordinates at a launch point, sensor data at the launch point (e.g., inertial measurement unit data), electronic signals received from a user device, or caller, (e.g., a caller bracelet, a flotation device, a cellular device carried by user, etc.), and/or images received by an image sensor or camera associated with the flight-enabled beacon.

The flight-enabled beacon system and device functions to alert and/or provide a beacon and/or a signal, such as a visual signal, a radio signal, a GPS coordinate signal, a sound, etc., that can be used by external parties or third parties to locate a position of importance (e.g., the position of an individual in distress or the location of a distress event). In some embodiments, the flight-enabled beacon system and device functions to deploy the flight-enabled beacon that can sustain a fixed position for a sustained period of time. Exemplary sustained periods of time can be greater than or equal to about 1 minute, about 3 minutes, about 5 minutes, about 10 minutes, about 1 to about 5 minutes, about 5 to about 10 minutes, about 10 to about 15 minutes, about 15 to about 20 minutes, about 30 minutes, about an hour, or about two hours. The flight-enabled beacon system and device is used for signaling a location, for example, the location around which it was deployed and/or a location to which it is directed by an individual or entity that deployed the flight-enabled beacon device. In some instances, the flight-enabled beacon can be an indicator of distress used by an individual or group to signal for help, for example, during an emergency at sea or when lost during a backpacking or hiking trip. Additionally, or alternatively, the flight-enabled beacon can be used for any other suitable applications, emergencies or otherwise, to provide a beacon and/or additional signal associated with a fixed location to which the flight-enabled beacon can be deployed. For example, in some instances, a flight-enabled beacon can be attached to a component to be recovered, for example, a weather balloon or other research device containing data, such that the flight-enabled beacon can be configured to return upon completion of a particular task in order to recover the attached components. In other examples, the flight-enabled beacon can be configured to deploy as a means of assisting with recovery of important information like a flight recorder that can be located using a flight-enabled beacon after a plane crash. As a further example, the flight-enabled beacon can be deployed by firefighters and smokejumpers in order to indicate the location of the firefighters and/or for airplanes to drop flame retardants, such as phosphorus. Additionally, or alternatively, the flight-enabled beacon can be deployed in order for rescuers to locate the firefighters and smokejumpers. As another example, the flight-enabled beacon may replace pyrotechnic techniques by launching explosives at a target altitude and holding that position despite weather conditions until a desired explosion moment. As a further example, the flight-enabled beacon may be used in military operations, such as signaling when and where to drop forces and/or supplies, or to mark a perimeter for some applications. In such embodiments, a flight-enabled beacon may include an infrared transmitter, as one example. The flight-enabled beacon device and system can be configured and/or adapted to function for any suitable application related to providing a means of signaling, marking, or designating a particular location, event, or to provide a visual indicator or signal of the location of an event.

It will be appreciated that flight-enabled beacon, portable drone, and SAR drone may be used interchangeably herein. Further, a light emitting source, beacon, light-emitting diode (LED), infrared (IR) light, or light may be used interchangeably herein. It will be appreciated that a number of reconfiguration and/or improvement embodiments are discussed herein in order to expand upon the present invention.

FIG. 1 is an exemplary diagram illustrating connected components for one embodiment of a flight-enabled beacon. As shown in FIG. 1, in conjunction with FIGS. 12-14, the flight-enabled beacon (100) comprises a processor (125, FIG. 14), memory (135, FIG. 14) coupled with the processor (125); one or more motors (110, FIG. 1, 112, FIGS. 12-14) in electronic communication with the processor (125) and configured to operate a rotational speed of one or more sets of rotatable blades, or propellers, (210, 220, FIGS. 12-14); one or more gimbals (240, 250, FIGS. 12-14) in electronic communication with the one or more motors (110, 112) and configured to operate one or more of an orientation or a direction of movement of the flight-enabled beacon (100) using the one or more rotatable blades (210, 220). Alternatively, the one or more gimbals (240, 250) is replaceable with a swashplate assembly. Further, a light emitting source (194, FIGS. 1, 12-14) in electronic communication with the processor (125) is configured to emit, at a target altitude, a light over a temporal period. It will be appreciated that the light emitting source (194) may comprise a number of programs for emitting light, such as, for example, emitting light immediately upon activation of the flight-enabled beacon (100), emitting light after a period of time while ascending to the target altitude, emitting light once the flight-enabled beacon (100) reaches the target altitude; emitting various colored lights, where the various colors may represent a specific situation, and/or emitting light in a patterned on/off cycle, such as SOS signal, among others.

The processor (125) of the flight-enabled beacon (100) is configured to receive inputs from one or more of the components (e.g., flight controller (130), gimbals (240, 250), motors (110, 112), sensors (140), light emitting source (194), etc.) and interfaces the inputs with command loops, executable files, programmed functions, or software programs stored in the memory (135) of the flight-enabled beacon. Instructions executable by the processor (125) can include commands to determine one or more of a horizontal or a vertical orientation of the flight-enabled beacon (100). The determination of orientation can be based at least in part or entirely on sensor information from one or more sensors (140) associated with the flight-enabled beacon (100). Additionally, or alternatively, instructions executable by the processor (125) can further comprise adjustments to a parameter of one or more the components of the flight-enabled beacon (100) including, but not limited to, a rotatable blade, a set of rotatable blades (210, 220), and/or a subset of rotatable blades (e.g., either 210 or 220); adjustments can be based at least in part on the determination of the horizontal or vertical orientation, or both, of the flight-enabled beacon (100). For example, one parameter can comprise a rotational speed of one or more of the rotatable blades, the sets of rotatable blades (210, 220), and/or subset of rotatable blades (e.g., either 210 or 220).

In some embodiments, the flight-enabled beacon (100) comprises a single motor (e.g., 110). In embodiments where the flight-enabled beacon (100) comprises a single motor (110), the flight-enabled beacon (100) may further comprise a gear box to provide torque multiplication for the counter sets of rotatable blades (210, 220).

In other embodiments, the flight-enabled beacon (100) can comprise two or more motors (110, 112). In embodiments where the flight-enabled beacon (100) comprises two or more motors (110, 112), the two or more motors can individually be configured to: operate at same or different speeds, control different components of the flight-enabled beacon (100), and/or can be fixed to different portions of the flight-enabled beacon (e.g., an upper motor 110 and a lower motor 112). Motors (110, 112) can be brushless or brushed and can comprise a rotor.

As previously mentioned, each of the motors (110, 112) can be connected to one or more rotors (120, FIG. 1) configured to exert rotation control. In some embodiments, the rotor or rotors (120) of the corresponding motor or motors (110, 112) can be configured to rotate about an axis, for example, circumferentially around an axis of the flight-enabled beacon (100). In embodiments comprising two or more motors (110, 112), rotation control can comprise a first rotor (120) associated with the first motor (110) and configured to move clockwise circumferentially around the axis formed by a housing, or body, of the flight-enabled beacon (100), and a second rotor (not shown) associated with the second motor (112) and configured to move counterclockwise circumferentially around a same axis (290, FIG. 2) formed by the housing, or body, of the flight-enabled beacon (100). Rotation control of the one or more motors (110, 112) and the corresponding rotor (120) of the motor can be configured to rotate the rotatable blades and/or the set of rotatable blades (210, 220). Additionally, the motors (110, 112) can be configured to operate one or more gimbals (240, 250, FIGS. 12-14). For example, each of the one or more motors (110, 112) can be individually or collectively configured to control a tilt of the one or more gimbals (240, 250), as described elsewhere herein.

Figure 9:
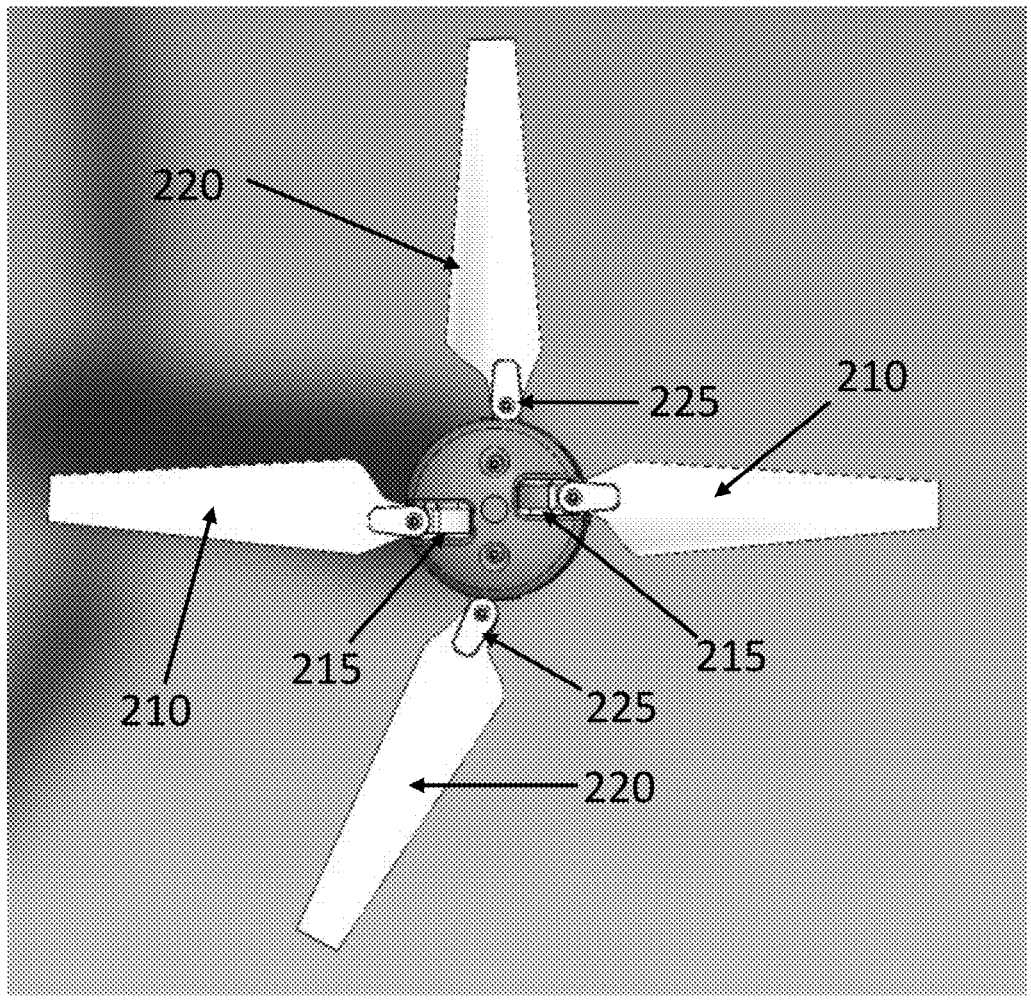
FIG. 9 is an exemplary perspective top view of the flight-enabled beacon in the active state with one or more sets of rotatable blades, or propellers, in the open configuration.
Figure 10:
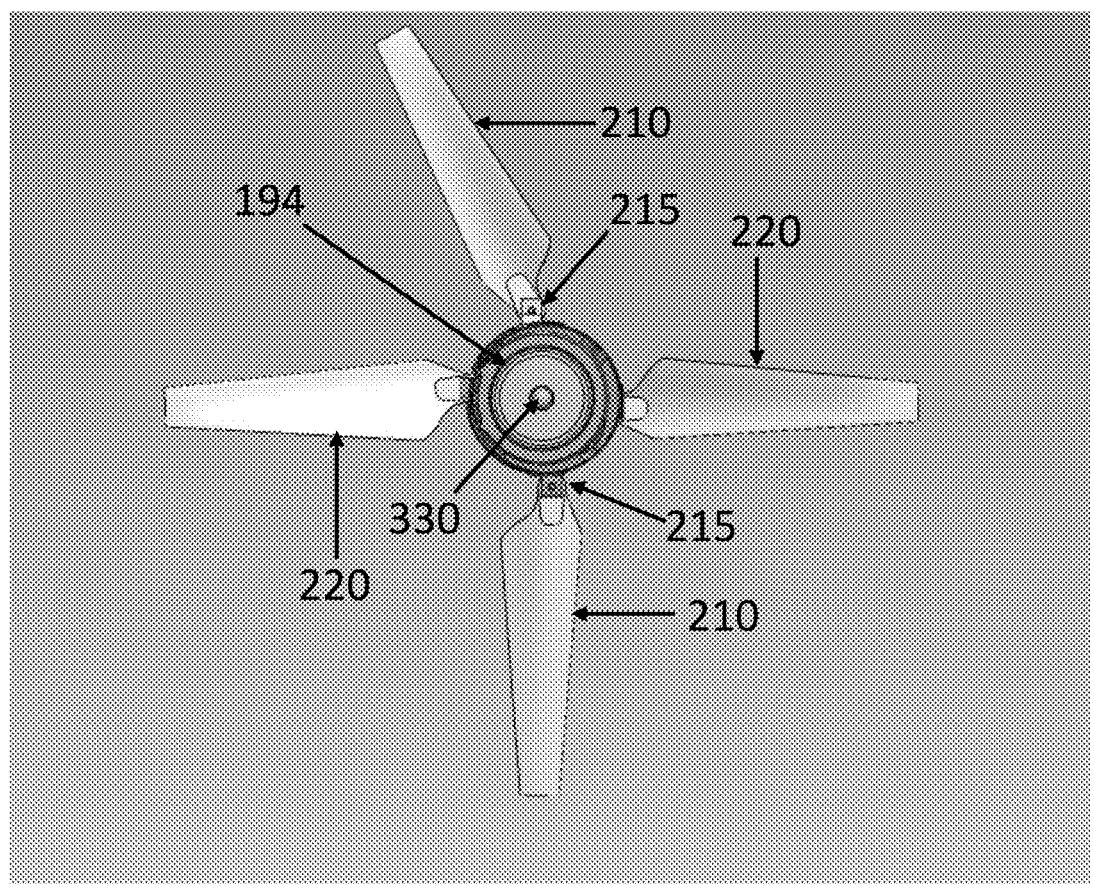
FIG. 10 is an exemplary perspective bottom view of the flight-enabled beacon in the active state with one or more sets of rotatable blades, or propellers, in the open configuration.

The single rotatable blade (210a-b, 220a-b) are configured into two or more sets of rotatable blades (210, 220), wherein a set may comprise a pair, triplet, or quartet of blades. In embodiments comprising two or more sets of rotatable blades (210, 220), the sets of rotatable blades (210, 220) are rotatable around the shared axis (290) or along a parallel plane of the shared axis (290). Rotatable blades (210a-b, 220a-b) have proximal edges, which are coupled to the housing, or body, of the flight-enabled beacon 100, and distal edges as shown in FIG. 9 and FIG. 10. The proximal and distal edges can be configured to have various sizes, shapes, curves, or other structural features that influence the aerodynamics of the rotatable blades (210, 220).

The sets of rotatable blades (210, 220) may be individually positioned anywhere along the length of the housing, or body, of the flight-enabled beacon (100). For example, the first set of rotatable blades (220) may be positioned proximally, near the light emitting source (194) of the flight-enabled beacon (100), and the second set of rotatable blades (210) may be positioned distally near an end opposite the light emitting source (194). Alternatively, both sets of rotatable blades (210, 220) may be positioned proximally or distally or within a center region of the housing, or body. Alternatively, the first set of rotatable blades (210) may be positioned proximally or distally and the second set of rotatable blades (220) may be positioned centrally along the housing, or body. In some embodiments, the first set of blades (210) can be positioned above the second set of blades (220) along the housing, or body, axis (290), such that each blade is oriented away from the origin of the axis (290) with the blades spinning in parallel relative to each other and perpendicular to said axis (290).

In some embodiments, the first set of rotatable blades (210) may be configured to rotate in a first direction. The first set of rotatable blades (210) comprises at least two rotatable blades (210a-b). In some embodiments, the second set of rotatable blades (220), comprising at least two rotatable blades (220a-b) may be configured to rotate in a second direction opposite the first direction of the first set of rotatable blades (210). For example, in one embodiment, the first set of blades (210) can be configured to rotate clockwise, while the second set of blades (220) rotates counterclockwise, or vice versa. Dynamically contra-rotating rotatable blades can be configured, for example, to cancel out motor torque during stationary level flight, with opposite pitch providing downdraft.

Each of the rotatable blades (210a-b, 220a-b) can be configured with a coupling assembly (215, 225) as shown in FIGS. 2-5, 7, 9, and 10. The coupling assembly (215, 225) attach the proximal, or inner, ends of each rotatable blade (210a-b, 220a-b) to move the rotatable blades from a closed configuration to an open configuration, and/or from the open configuration to the closed configuration. In some embodiments, the coupling assembly (215, 225) comprises a hinge and a spring element. The spring element may be used to bias the set (e.g., the first set of rotatable blades (210), the second set of rotatable blades (220), etc.) to the open configuration. Alternatively, the spring element may be used to bias one or both sets of rotatable blades (210, 220) to the open and/or closed configurations. More specifically, as shown in FIGS. 2-10, the first coupling assembly (215) couples the proximal, or inner, ends of the first rotatable blades (210a-b) with the first rotor control (120) of motor (110) may comprise a hinge to move the first set of rotatable blades (210) between the closed configuration (shown in FIGS. 2-6) and the open configuration (shown in FIGS. 7-10). Additionally, or alternatively, the second coupling assembly (225) couples the proximal, or inner, ends of the second rotatable blades (220a-b) with the second rotor control of motor (112) may comprise a hinge to move the second set of rotatable blades (220) between the closed position (FIG. 3 to FIG. 6) and the open position (FIG. 7 to FIG. 10). In some embodiments, as previously mentioned, the first coupling assembly (215) and/or the second coupling assembly (225) comprises an optional spring element to bias the attached blades to the open configuration (or alternatively, or additionally, the closed configuration).

Figure 7:
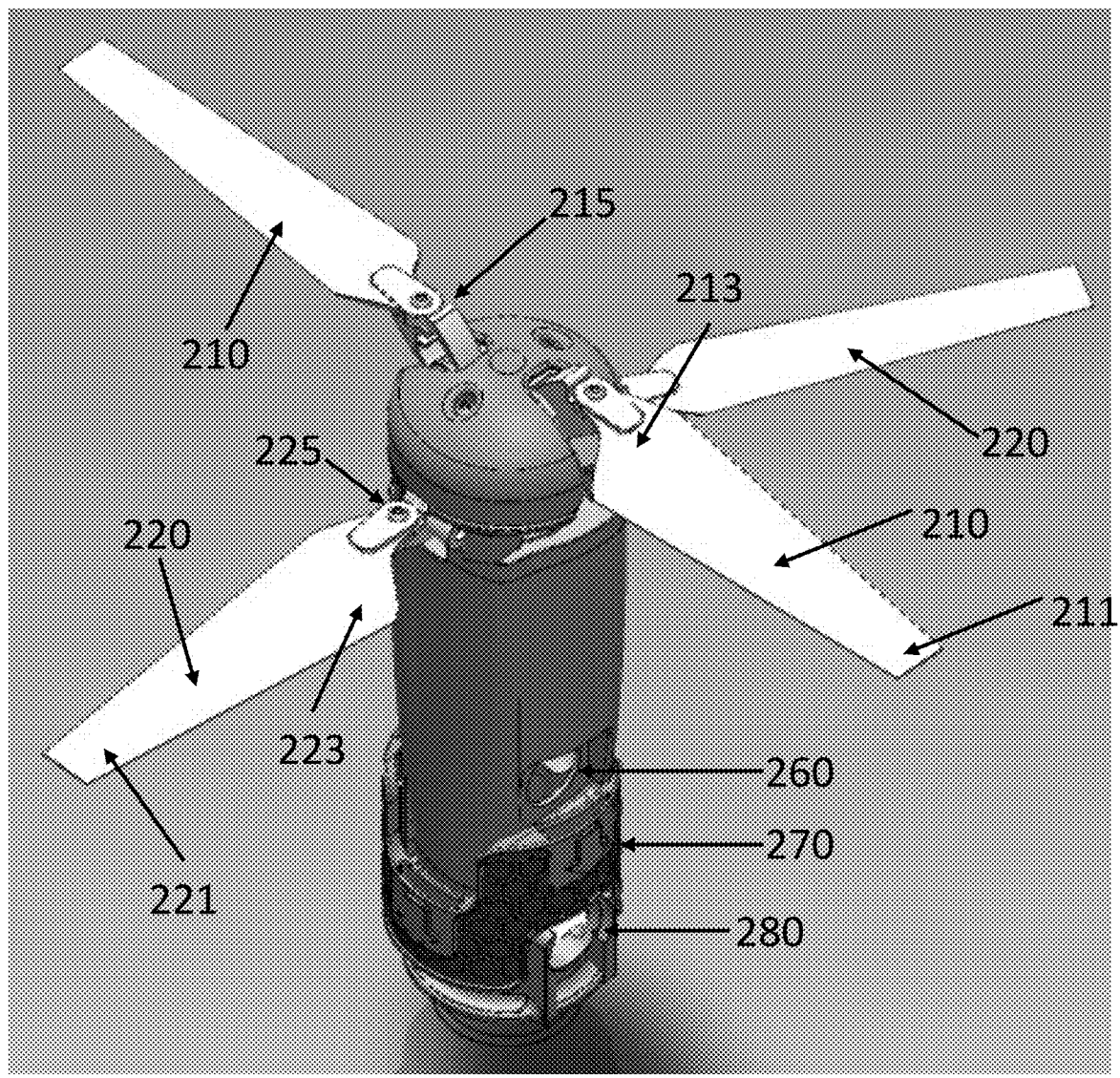
FIG. 7 is an exemplary perspective view of the flight-enabled beacon in an active state with one or more sets of rotatable blades, or propellers, in an open configuration.

Further, as shown in FIG. 7, first and second rotor assemblies, each comprising one motor (110, 112) and corresponding rotor rotational control (120), further comprise one of the first and second sets of rotatable blades (210, 220), where each rotatable blades has a proximal surface (213, 223) and a distal surface (211, 221). Optionally, each of the distal surfaces (211, 211) may be manufactured using a reflective material or have a reflective coating, such that when the light source (194) is activated, the emitted light reflects off one or all of the distal surfaces (211, 221) providing more visual intensity and coverage. In any of the herein mentioned embodiments, the entire rotatable blade (210, 220) may be optionally reflective such that when light from the light emitting source (194) is activated, emitted light reflects off all surfaces.

Figure 12:
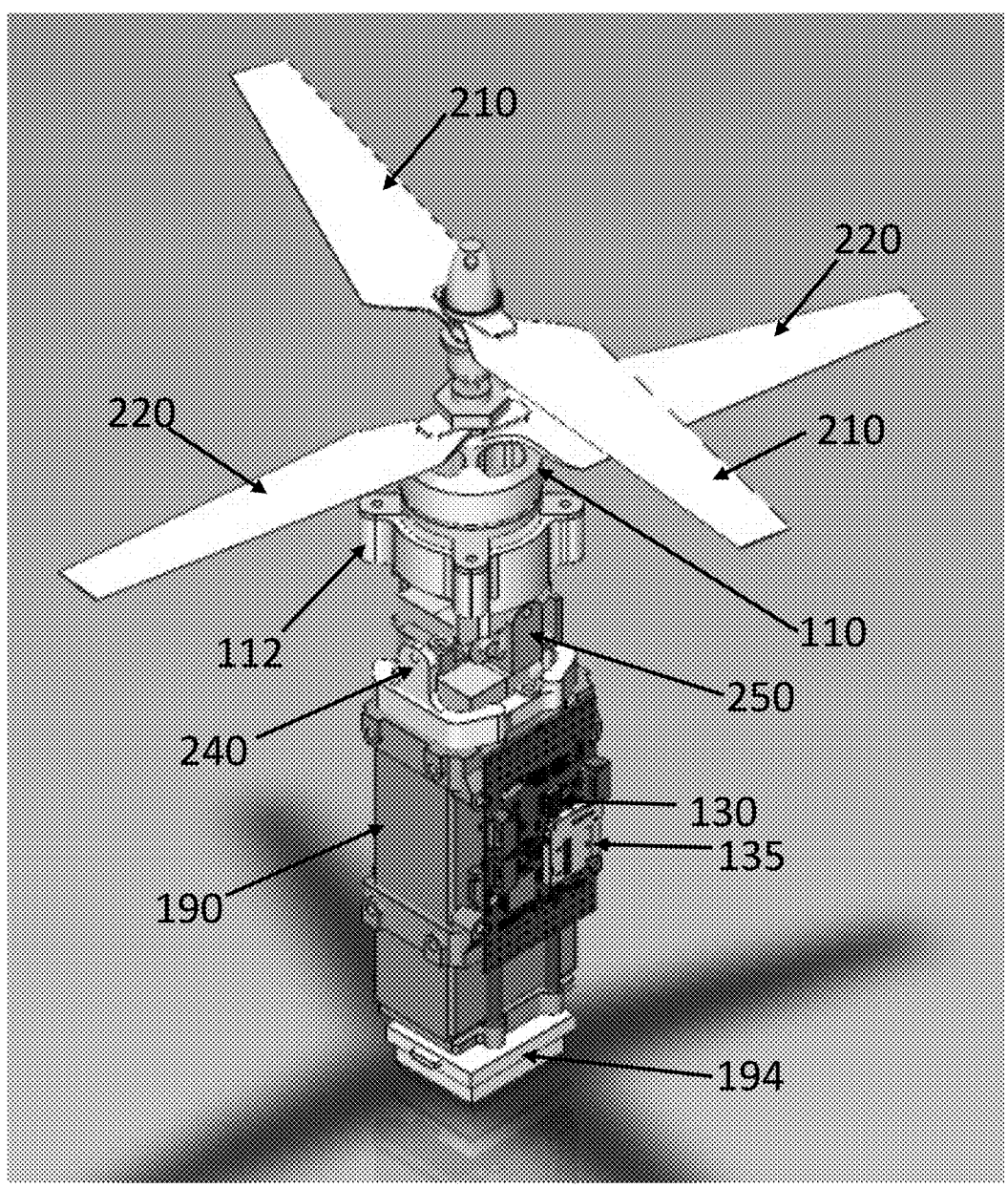
FIG. 12 is an exemplary perspective view showing internal components of the flight-enabled beacon.
Figure 13:
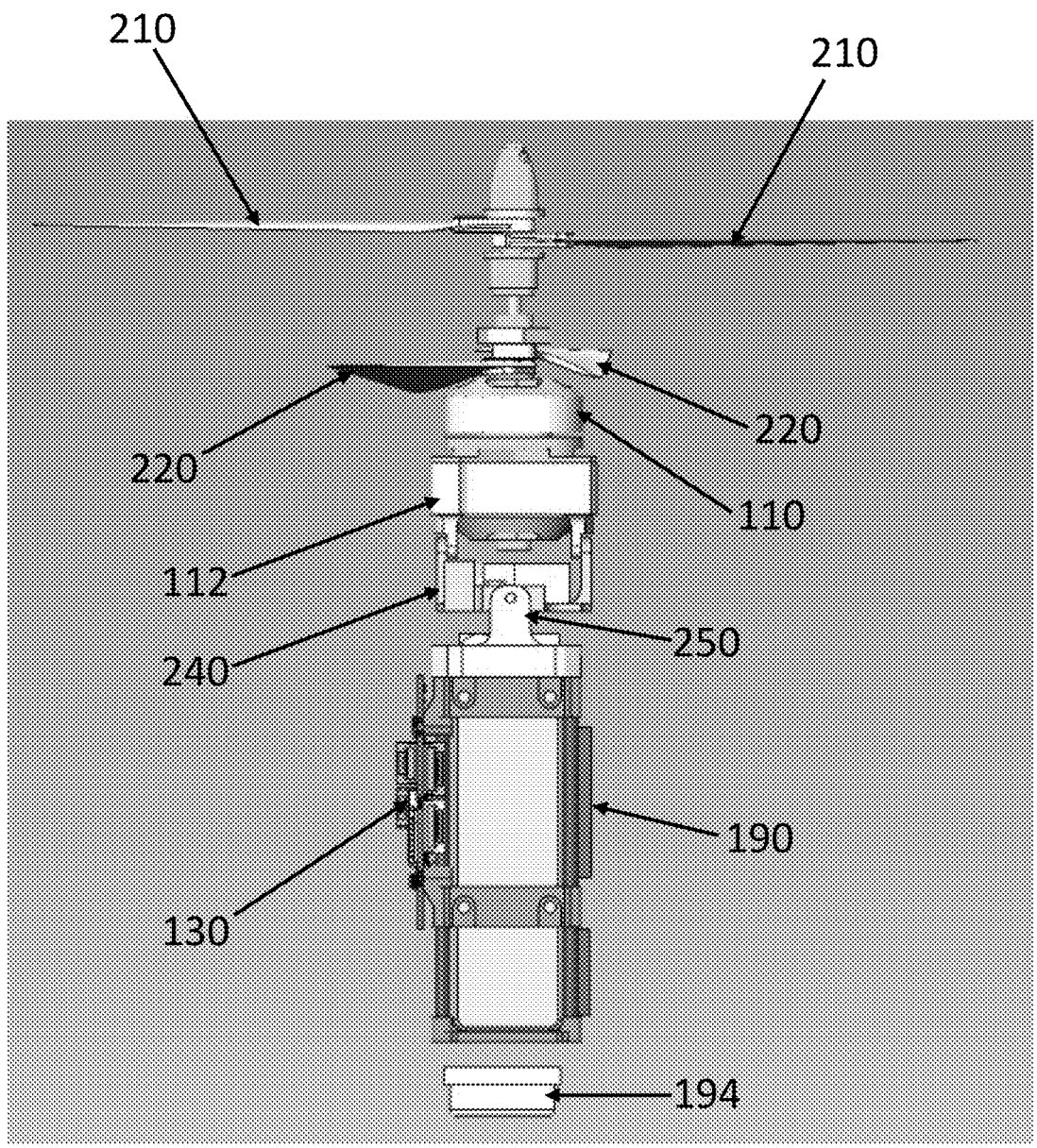
FIG. 13 is an exemplary perspective side view showing the internal components of the flight-enabled beacon.
Figure 14:
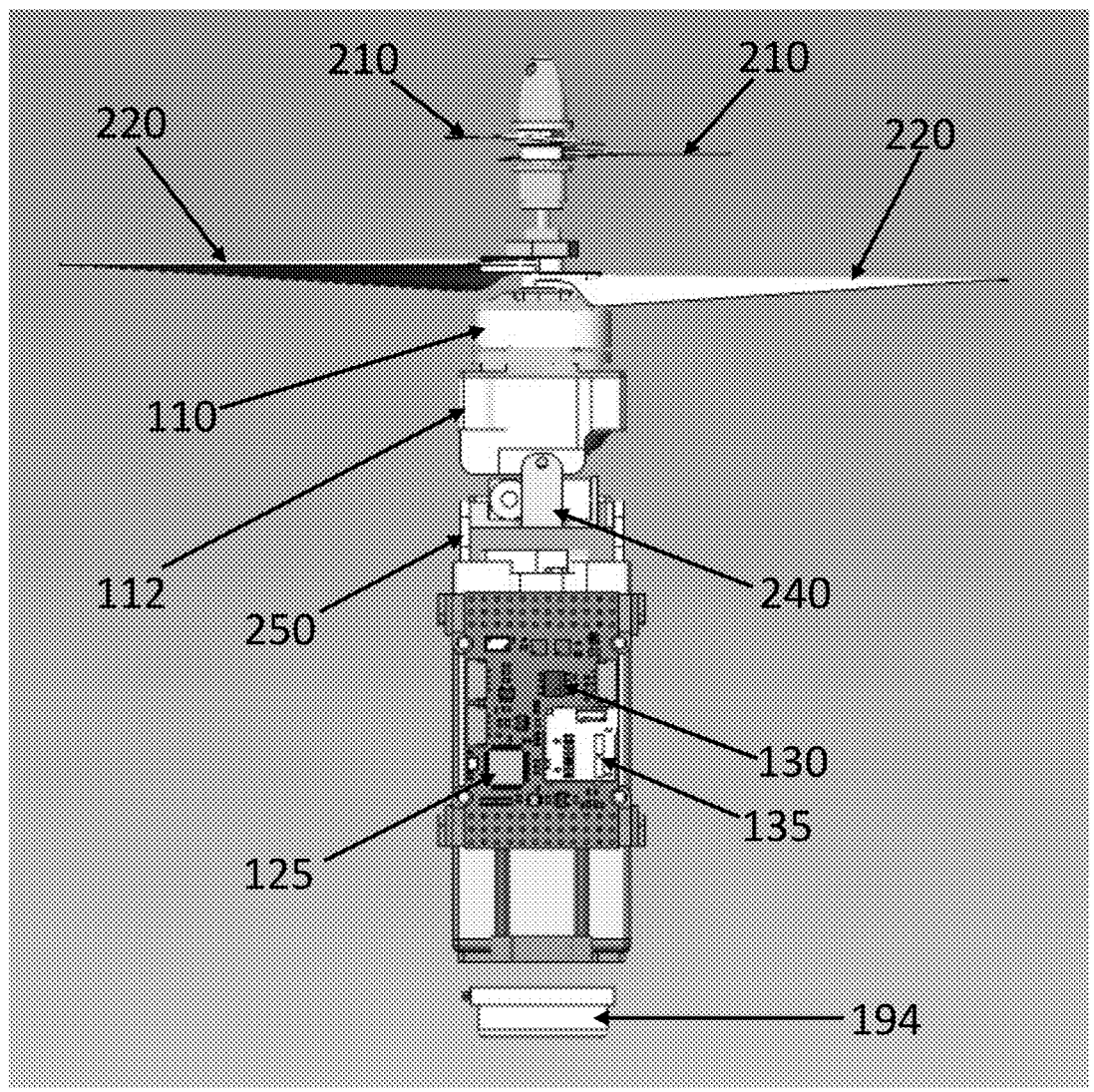
FIG. 14 is an exemplary perspective opposite side view showing the internal components of the flight-enabled beacon.
Figure 15:
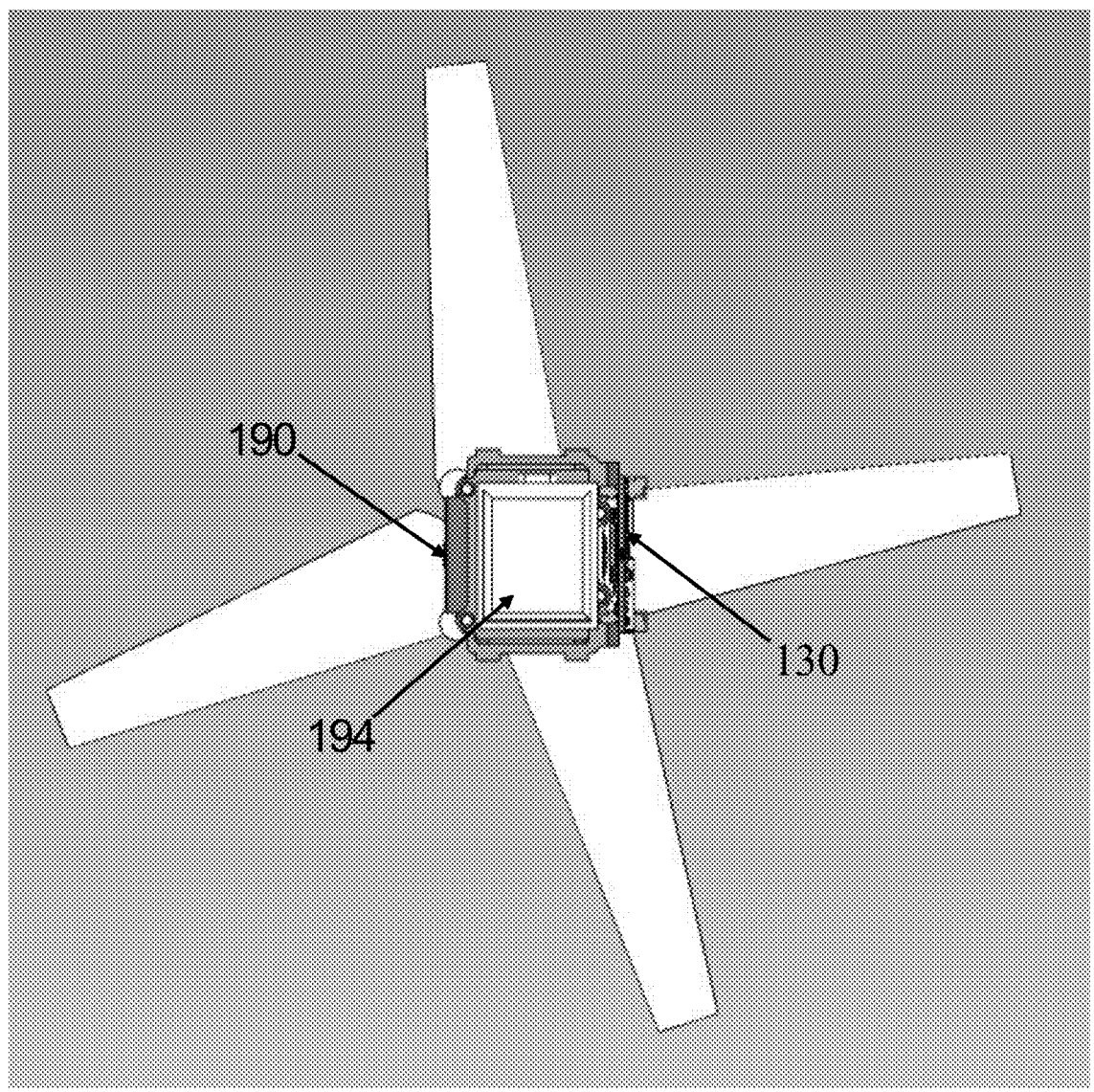
FIG. 15 is an exemplary perspective bottom view showing the internal components of the flight-enabled beacon.
Figure 16:
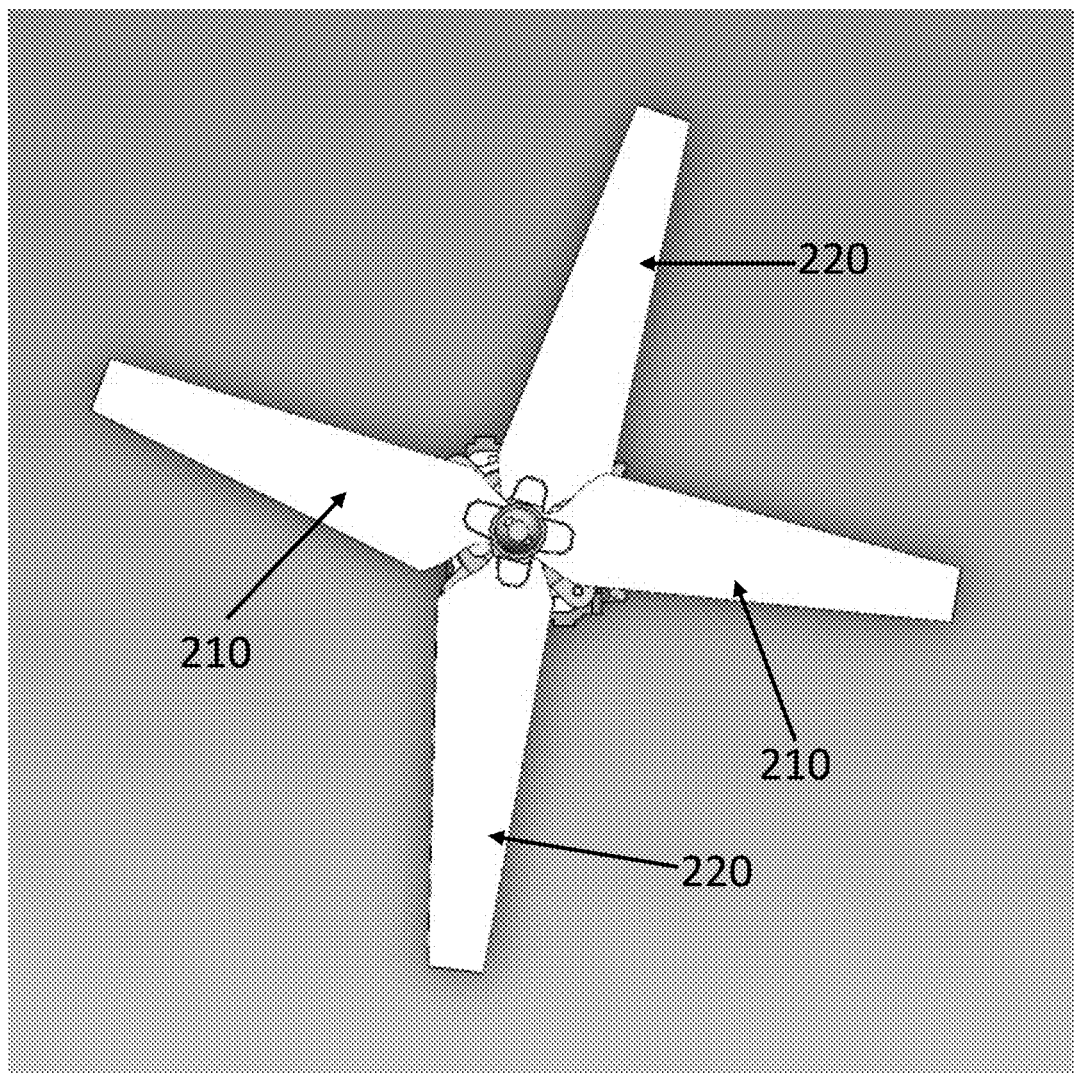
FIG. 16 is an exemplary perspective top view showing the internal components of the flight-enabled beacon.

The flight controller (130, FIG. 1), which may be, for example, a microcontroller, is positioned within the housing, or body, of the flight-enabled beacon (100) and is coupled to a number of components, such as one or more of: the one or more motors (110, 112), the one or more rotor rotation control (120) of the motors (110, 112), the processor (125), the sensor (140) or set of sensors, the one or more gimbals (240, 250), an optional swashplate, the individual rotatable blades (210a-b, 220a-b) and/or the set of rotatable blades (210, 220), a power source (190), an optional safety unit, an optional audio unit, an inertial sensor and measurement unit (140), an optional GPS module (170), an optional transceiver (160), an optional camera (180), the light source (194), an optional flotation unit, or housing. FIGS. 12-14 show an example of the flight controller (130) positioned on the body of the flight-enabled beacon (100).

The flight controller (130) can be configured to collect and/or receive data and other information from the one or more components of the flight-enabled beacon (100), such as the sensor (140) or set of sensors, gimbals (240, 250), each rotatable blade (210a-b, 220a-b) and/or the sets of rotatable blades (210, 220), power source (190), safety unit, audio unit, inertial measurement unit (140), GPS module (170), transceiver (160), camera (180), light emitting source (194), flotation unit, housing, etc., and perform an actionable outcome. Examples of data and other information include, for example, sensor data, altitude coordinates, orientation data, inertial data for navigation, automatic identification system (AIS) radio data (e.g., receive a land command), etc. More specifically, the flight-enabled beacon (100) may be configured with an antenna receiver, such as shown as 1802 in FIG. 18, or transceiver (160, FIG. 1) for receiving a radio frequency signal from an incoming rescue operation or vehicle, for example helicopter (1302), indicating the land command. Further, the flight controller (130) can be configured to receive and interpret data and information from a transceiver, or receiver, a GPS module, camera, a battery monitor, the inertial measurement unit (140), other onboard sensors, or user input (e.g., a "to follow me" command, a "maintain proximity to the user" command, and/or a "maintain the user in a line of sight" command in embodiments when the flight-enabled beacon (100) comprises a camera). In a further example, the flight controller (130) may communicate with the GPS module (170) and may be utilized by hikers, hunters, boaters, or other users desiring to use the flight-enabled beacon (100) as a positional tracking or locating system. The flight-enabled beacon (100) may optionally include a display and/or the flight-enabled beacon (100) may be in communication with a remote display showing its position and/or GPS coordinates in real-time. In some instances, the flight controller (130) can perform various operations with the components to perform an operation or method (e.g., controlling the gimbals (240, 250), or swashplate, controlling the rotor speed via the rotor rotation control (120) and motors (110, 112) of the individual or sets of rotatable blades (210, 220), activating the camera (180), activating the light emitting source (194), receiving or transmitting sounds or words via the audio unit, activating the safety unit, etc.); execute a preprogrammed or initiated command; and/or ascend and maintain the target altitude for a fixed time period. In a further embodiment, the flight controller (130) can maintain, or hover, the flight-enabled beacon (100) at the target altitude by using an internal command program loop, which calculates differences between its actual orientation and/or altitude and the target orientation and/or altitude and adjusts a parameter equivalent to the calculated difference. The flight controller (130) may use the feedback parameter, or command program loop output, to adjust the pitch, yaw, roll, and/or speed of individual and/or sets of rotatable blades (210, 220). In another embodiment, the flight controller (130) may receive input data, such as coordinates or commands, from a handheld controller or other user device to hold the orientation and/or target altitude.

Alternatively, or additionally, the flight controller (130) of the flight-enabled beacon (100) may be configured to execute a pre-determined flight pattern (e.g., x, y pattern) around the target altitude or target GPS coordinates. For example, the light-enabled beacon (100) may ascend and fly east a pre-determined distance, west a pre-determined distance, south a pre-determined distance, and/or north a pre-determined distance before returning to the target altitude and/or target GPS coordinates. Further, for example, the light-enabled beacon (100) may fly a circle or other shape flight pattern around the target GPR coordinates before returning to the target altitude and/or target GPS coordinates.

Further, in some embodiments, the flight controller (130) of the flight-enabled beacon (100) may be configured to fly to the target or predetermined altitude, capture one or more images with an image sensor or camera (180, FIG. 1), and return to the launch point without user feedback (i.e., no input from a user device or handheld controller). Such embodiments may be ideal, for example, for accident recreation or gathering information in advance of first responder arrival on a scene.

Further, in some embodiments, the flight controller (130) of the flight-enabled beacon (100) may be configured to fly to the target or predetermined altitude and provide feedback to a user device (e.g., cellular device) or other display. Such an embodiment may provide visualization from the target altitude to help rescuers, first responders, etc.

Further, in some embodiments, the flight controller (130) of the flight-enabled beacon (100) may be configured to fly to the target or predetermined altitude and allow a user to direct a position of the flight-enabled beacon (100). Such embodiments may allow a user to determine their position (e.g., unsafe position) and a possible path or set of directions to move to a second position (e.g., safe position).

The flight controller (130) can be adapted or configured to dynamically and automatically change at least a first pitch angle of the first set of rotatable blades (210). Alternatively, or additionally, the flight controller (130) can be adapted or configured to dynamically and automatically change a second pitch angle of the second set of rotatable blades (220). For example, the flight controller (130) in combination with two gimbals (240, 250) is configured to tilt both sets of rotatable blades (210, 220) together in one direction. To achieve movement, the flight controller (130) is configured to direct both sets of rotatable blades (210, 220) to a varying degree of pitch in one or both the x and y planes. Further, for example, the flight controller (130) in combination with one gimbal (e.g., 240 or 250) is configured to tilt both sets of rotatable blades (210, 220) together in one direction. To achieve movement, the flight controller (130) is configured to direct both sets of rotatable blades (210, 220) to a varying degree of pitch in one of the x or the y plane. For a one-gimbal system, yaw rotation about its axis (290) is changed by altering a speed of each set of rotatable blades (210, 220) differently, which is not needed in a two-gimbal system. Further for example, one or both sets of the rotatable blades (210, 220) may be connected to a swashplate to control its motion.

The flight controller (130) is connected to a single motor assembly or multiple motor assemblies to control a pitch angle (e.g., a first pitch angle, a second pitch angle, etc.). For example, the flight controller (130) receives one or more inputs (e.g., sensor data, user input, GPS coordinates, etc.) to control flight. Control of the pitch angle may be performed by the flight controller (130) in response to a preprogrammed command or in response to dynamic commands or inputs received from one or more of the components and/or sensors associated with the flight-enabled beacon (100), which may be either integrated onboard the flight-enabled beacon (100) or externally located.

The flight controller (130) can be configured to trigger activation of one or more of: the set of rotatable blades (210, 220) the camera (180), the light emitting source (194), the audio unit, the safety unit, or any other component. Triggering activation can occur in response to a detected signal from a sensor, from a preprogramed command, from a command initiated off the flight-enabled beacon (100), from data or information received by the flight-enabled beacon (100) from a sensor or transmitting device remote to the flight-enabled beacon (100) (e.g., not installed on the flight-enabled beacon itself), and/or user input (e.g., using a handheld controller, a flight-enabled beacon caller, or via selection or activation of a user input module (150) (e.g., a button (280, FIGS. 7-8) or a latch (270, FIGS. 2-4, 7, 8)).

The flight controller (130) can be configured to execute the command loop program in communication with the processor (125). The command loop program can be configured to determine an initial orientation of the flight-enabled beacon (100), an initial altitude of the flight-enabled beacon (100), or both the initial orientation and the initial altitude of the flight-enabled beacon (100). Additionally, the command loop program can be configured to determine a target orientation of the flight-enabled beacon (100), a target altitude of the flight-enabled beacon (100), or both a target orientation and a target altitude of the flight-enabled beacon (100).

The flight controller (130) can be configured with an autopilot feature. In some embodiments, the autopilot feature can comprise one or more autonomous functions including but not limited to: hold altitude (as described elsewhere herein), hold position (as described elsewhere herein), determine waypoints, the "follow me" command, a failsafe feature, and many more. For example, a waypoint is a set of coordinates that identify a specific point in physical space, determined for example by the GPS module (170). Further for example, the "follow me" command enables the flight-enabled beacon (100) to follow a person or object in real time, via communication with a portable user device (e.g., mobile device) and/or using recognition software). In this mode, the flight-enabled beacon (100) is configured to maintain the user or a different object in camera-focus at all times. In some embodiments, the flight-enabled beacon (100) may include the failsafe feature, so that the flight-enabled beacon (100) returns to the launch point in the event it loses communication with a user device and/or a handheld controller; in other embodiments, the flight-enabled beacon (100), after launch, is not controllable by a handheld controller and no failsafe mode exists.

The flight controller (130) can comprise a microcontroller configured to automatically determine and control x and y displacement relative to the launch point. Additionally, or alternatively, the microcontroller may be configured to automatically control z displacement relative to the launch point.

The flight controller (130) can be configured to regulate motor speeds and provide yaw rotation control. The rotor rotation control (120) and one or more motors (110, 112) are in electrical communication with the flight controller (130). Further, an electronic speed controller (ESC) associated with the flight controller (130) is configured to vary the speed, direction, and/or to dynamically break the rotation of the rotor rotation control (120) coupled with the motors (110, 112).

Figure 8:
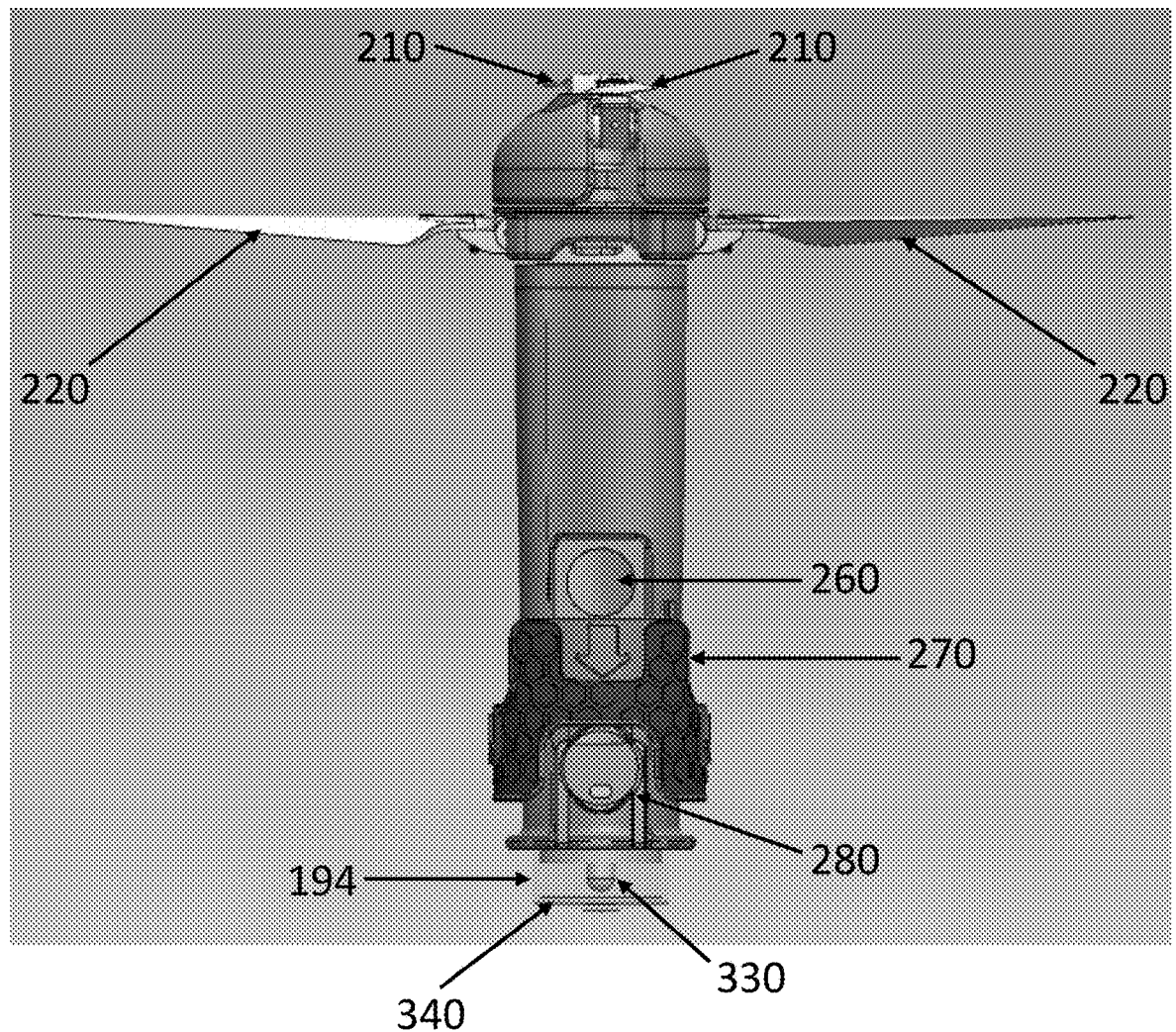
FIG. 8 is an exemplary perspective side view of the flight-enabled beacon in the active state with one or more sets of rotatable blades, or propellers, in the open configuration.

In some embodiments, the flight-enabled beacon (100) is configured to receive signals via the user input module (150), which may include the latch (270) and/or buttons (260, 280, FIGS. 7 and 8). More specifically, the flight-enabled beacon (100) may be activated when the latch (270) is physically repositioned, which operates to change the configuration of the sets of rotatable blades (210, 220), and/or pressing buttons (260, 280, FIGS. 7 and 8), which may operate to only turn the light emitting source on and off. In some embodiments, the flight-enabled beacon (100) functions without further user input after the initial launch activation (e.g., repositioning the latch (270)). The user input module (150) may further be configured to receive input signals from the transceiver, or AIS, (160), which comprises an antenna, transmitter, and receiver, and is configured to receive over-the-air or otherwise transmitted signals. Transmitted user input signals, such as radio frequency and/or Bluetooth signals, etc., received from a handheld controller or other user device may comprise instructions, data, and/or activation commands. The transmitted user input signals are received by the transceiver (160) and provided to the processor (125). The instructions, data and/or activation commands are processed in order to control one or more components of the flight-enabled beacon (100) (e.g., light emitting source (194), camera (180), etc.) and/or provided to the flight controller (130) to initiate a change or modification in the flight, such as orientation and/or altitude.

The flight-enabled beacon (100) described herein can comprise the one or more gimbals (240, 250, FIG. 12), a swashplate, or other compatible pivotable support mechanisms that allow rotation of any object along a single axis or multiple axes. In embodiments comprising two or more gimbals, the gimbals (240, 250) can be mounted in relation to each other to provide support mechanisms for more than one axis. One gimbal can be configured such that the light emission from the light emitting source (194) retains a fixed orientation relative to gravity. More specifically, the flight controller (130) in electronic communication with the one or more gimbals (240, 250) is configured to control orientation of the light emitting source (194) during deployment, flight, or deactivation. In further embodiments, control of the gimbals (240, 250) is configured to modulate coordinated movement of the flight-enabled beacon (100). Coordinated movement can comprise feedback provided to or received from one or more motors (110, 112), sensor input including feedback provided by internal and external sensors, the inertial motion unit (140), the user module (150), the optional AIS or transceiver (160), GPS (170), optional camera (180), etc.

More specifically, the flight controller (130) may receive the feedback from the one or more components indicating detected weather conditions (e.g., wind conditions, precipitation conditions, visibility conditions, etc.), the altitude and trajectory of the beacon, the current coordinates, and images of the environment, and preform operations, maneuvers, and/or responses according to those reported conditions. In some instances, the two or more gimbals (240, 250) can be used to generate a counterbalance allowing one or more components of the flight-enabled beacon (100) to orient at a fixed position relative to gravity while in motion. In some embodiments comprising two or more gimbals (240, 250), the first gimbal (e.g., 240) can orient the flight-enabled beacon (100) in the x-plane and the second gimbal (e.g., 250) can orient the flight-enabled beacon (100) in the y-plane, where the x-plane and y-plane are oriented relative to a z-plane which represents the direction of the gravitational force.

The one or more gimbals (240, 250) can be in electronic communication with the processor (125) and configured to manipulate movement in one or more of: pitch angle, yaw rotation, roll, altitude, etc., of the flight-enabled beacon (100). In some embodiments, the gimbals (240, 250) can be in electronic communication with the processor (125) and configured to modulate or change direction of the flight-enabled beacon (100) using the one or more rotatable blades (210*a-b*, 220*a-b*) of the set of rotatable blades (210, 220). For example, in some embodiments, the first gimbal (240) in conjunction with the first motor (110) achieves a first pitch angle of the flight-enabled beacon (100) by modulating the first set of rotatable blades (210). Further, the second gimbal (250) in conjunction with the second motor (112) achieves a second pitch angle of the flight-enabled beacon (100) by modulating second set of rotatable blades (220). Additionally, or alternatively, the first or second rotor assemblies can comprise a swashplate configured to control the pitch angle of the first or second set of rotatable blades (210, 220).

Figure 11:
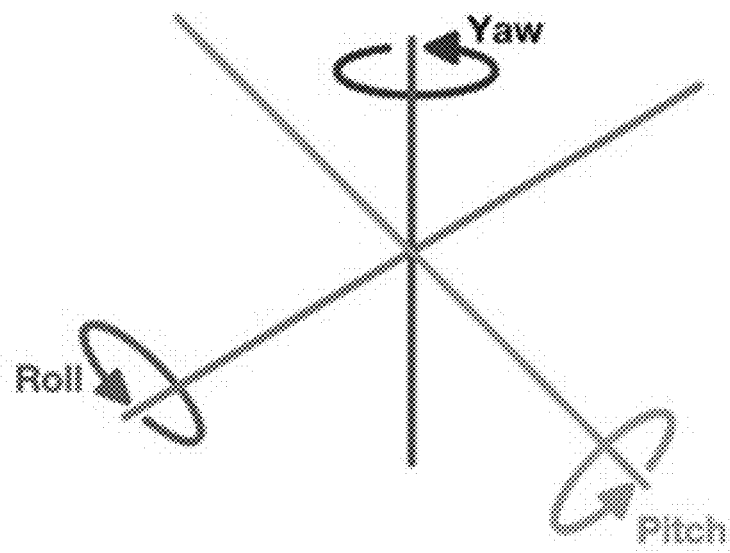
FIG. 11 is an exemplary diagram illustrating three different kinematic axes that can be modulated by the flight controller of the flight-enabled beacon.

In some embodiments, the gimbals (240, 250) can comprise a pivoting mount, wherein the pivoting mount can rotate about the x, y, and/or z axes to provide further stabilization and directing of cameras, sensors, components (e.g., rotatable blades and/or the sets of rotatable blades, power sources (105, 190), safety unit, audio unit, inertial measurement unit (140), GPS module (170), transceiver (160), light emitting source (194), floatation unit, or housing). The gimbals (240, 250) can comprise a motor (e.g., brushless DC motor for driving angular positions), including wound coils and dedicated control circuitry configured to reduce vibration. As described elsewhere herein, each gimbal (240, 250) may be actuated through a servo, which may have its own control circuitry and utilize a drive motor (e.g., brushless DC motor). In some embodiments, each servo may be configured to dampen flight controller vibrations. Additionally, or alternatively, the flight controller (130) may be configured to dampen its own vibrations. In some embodiments, the flight-enabled beacon (100) can comprise the first gimbal (e.g., 240) configured to control the roll and the second gimbal (250) configured to control the pitch angle. FIG. 11 is an exemplary diagram illustrating three different x, y, and z kinematic axes that can be modulated by the flight controller (130) of the flight-enabled beacon. Advantageously, the one or more gimbals (240, 250) provide the degrees of freedom (e.g., roll, pitch, or yaw).

As previously mentioned, the flight-enabled beacon (100) can further comprise one or more servos and receiver connection coupled to the one or more gimbals (240, 250) and in electronic communication with the processor (125) and/or the memory (135) coupled with the processor (125). The processor (125) may be configured to send a pulse-width modulation (PWM) signal comprising a series of repeating pulses of variable width where either the width of the pulse (most common modern hobby servos) or the duty cycle of a pulse train (less common today) to the one or more servos in order to position the flight-enabled beacon (100). Each servo controls the tilt of the respective gimbal (240, 250), permitting translation in the x or y axis. Relative speeds of the two rotators are used to control yaw rotation and rotor speed is used to control movement along the z-axis (i.e., altitude). In some embodiments, the flight-enabled beacon (100) can comprise the first gimbal (e.g., 240) configured to control roll and the second gimbal (e.g., 250) configured to control pitch, wherein each gimbal (240, 250) has a separate servo.

The light emitting source or beacon component (194) of the flight-enabled beacon (100) can be in communication with the processor (125). The processor (125) can be configured to control, activate, or modulate the light emitting source (194); for example, using input from the flight controller (130) or a microcontroller. In some embodiments, the processor (125) is configured to control, activate, or modulate the light emitting source (194) in response to detected input signals, including attainment of the target altitude. For example, the detected input signal to activate the light emitting source (194) may include one or more of: a user input pressing the user input element (150) (e.g., button 280), a flight-enabled beacon launch, detection of attainment of the target altitude, etc. In embodiments where the light emitting source (194) is activated by launching the flight-enabled beacon (100), the light emitting source (194) may activate at the start of flight; in other instances, the light emitting source (194) may be activated at a pre-determined altitude to protect a user's eyes and/or to conserve battery, or activate once the target altitude is reached. The processor (125) can control the illumination pattern (e.g., SOS illumination pattern), intensity, duration of illumination, colors, etc. In some embodiments, the light-enabled beacon (100) can be configured to change the direction of the emitted light, using control of one or more gimbals (240, 250), and/or changes to the rotatable blades (210, 220) performed by the motor (110, 112), change can be performed in response to programmed operations stored in the memory (135) of the flight-enabled beacon (100), in communication with the processor (125).

Figure 6:
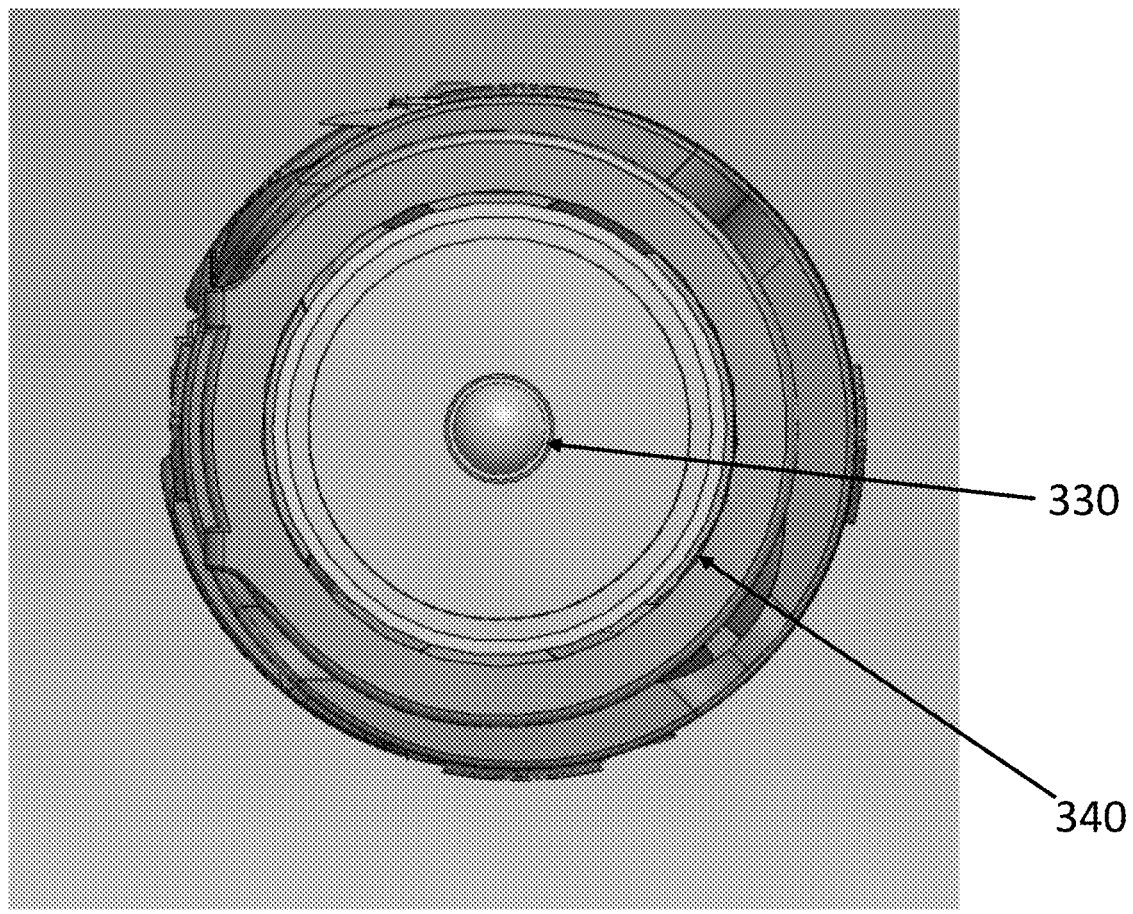
FIG. 6 is an exemplary perspective bottom view of an embodiment of the flight-enabled beacon in the inactive state with one or more sets of rotatable blades, or propellers, in the closed configuration.

FIG. 6 is an exemplary perspective bottom view of an embodiment of the flight-enabled beacon in the inactive state with one or more sets of rotatable blades, or propellers, in the closed configuration. As shown, the light emitting source (194) can comprise visible light or infrared (IR) light. The light emitting source (194) can comprise a light (330, FIGS. 6 and 8) that is a single LED or an array of LEDs or additionally, or alternatively, the light may comprise an IR transmitter that can be seen by users wearing night-vision goggles or the like. In some embodiments, the array of LEDs (330) in the flight-enabled beacon (100) can be oriented in a pattern that retains intensity while also reducing battery dependency. In further embodiments, the pattern of illumination of the array of LEDs can be controlled by the processor (125) in coordination with other inputs (e.g., battery life, weather conditions, sensor input (e.g., altitude, water, etc.); executable program stored in the memory (135); or user input (e.g., via a user input element (150)) of the flight-enabled beacon (100).

In some embodiments, the light emitting source (194) comprises a light housing (340, FIG. 8) configured to protect the light emitting source (194) and emit light in a particular direction or radiate or orient light in many spatial directions. In some embodiments, the light housing (340) is configured to be independently movable relative to the housing of the flight-enabled beacon (100). In further embodiments, the light housing (340) can be positioned and set prior to engaging and activating the flight-enabled beacon (100); in other instances, the light housing (340) can comprise rotating or pushable means for moving or modulating the direction of the light emitting source (194) independent of the orientation of the positioning of the flight-enabled beacon (100). In further embodiments still, the light housing (340) can be connected to the processor (125) and integrated into an executable program capable of controlling the direction, intensity, color, pattern, etc., of the light emitting source (194) depending on inputs from a sensor or set of sensors, the gimbals (240, 250) or a swashplate, individual rotatable blades and/or a set of rotatable blades (210, 220), the power source (190), safety unit, audio unit, inertial sensor and measurement unit (140), GPS module (170), transceiver (160), camera (180), flotation unit, or housing. In some instances, the pattern of illumination of an array of LEDs can be optimized and controlled by the processor (125).

In some embodiments, the light emitting source (194) is fixed to the body or housing of the flight-enabled beacon (100). The light emitting source (194) can be configured to provide a visual cue. Alternatively, or additionally, an automated light emitting source (194) can also activate an audible cue via a speaker, for example, a speaker fixed internally or externally to the housing or body.

As mentioned, the light emitting source (194) can be configured to emit once the target altitude is attained. Additionally, or alternatively, the light emitting source (194) can be configured to change intensity, rate, or intensity and rate, according to one or more parameters of the orientation, altitude, pitch, or other detected or controlled aspects of the flight and/or positioning of the flight-enabled beacon (100). The light emitting source (194) can be connected to an actuator to control one or more of: color, blink-pattern, and brightness of the LED light. The emitted light can be visual or infrared and can have the characteristic of a flare (e.g., intensity of greater than 5,000 lumens, and illumination for a fixed duration of between 1 and 30 minutes). Additionally, or alternatively, the light emitting source (194) may continue to blink after the flight-enabled beacon (100) has landed or fallen due to, for example, low battery, user input, AIS input (e.g., to land drone for Coast Guard rescue), etc. The light emitting source (194) may continue to blink until the power source has been completed drained or used.

The flight-enabled beacon (100) preferably functions to and is configured to have a small profile, be weathertight, and be lightweight and compact so that it can be easily carried and deployed for fast efficient reliable deployment.

Figure 2:
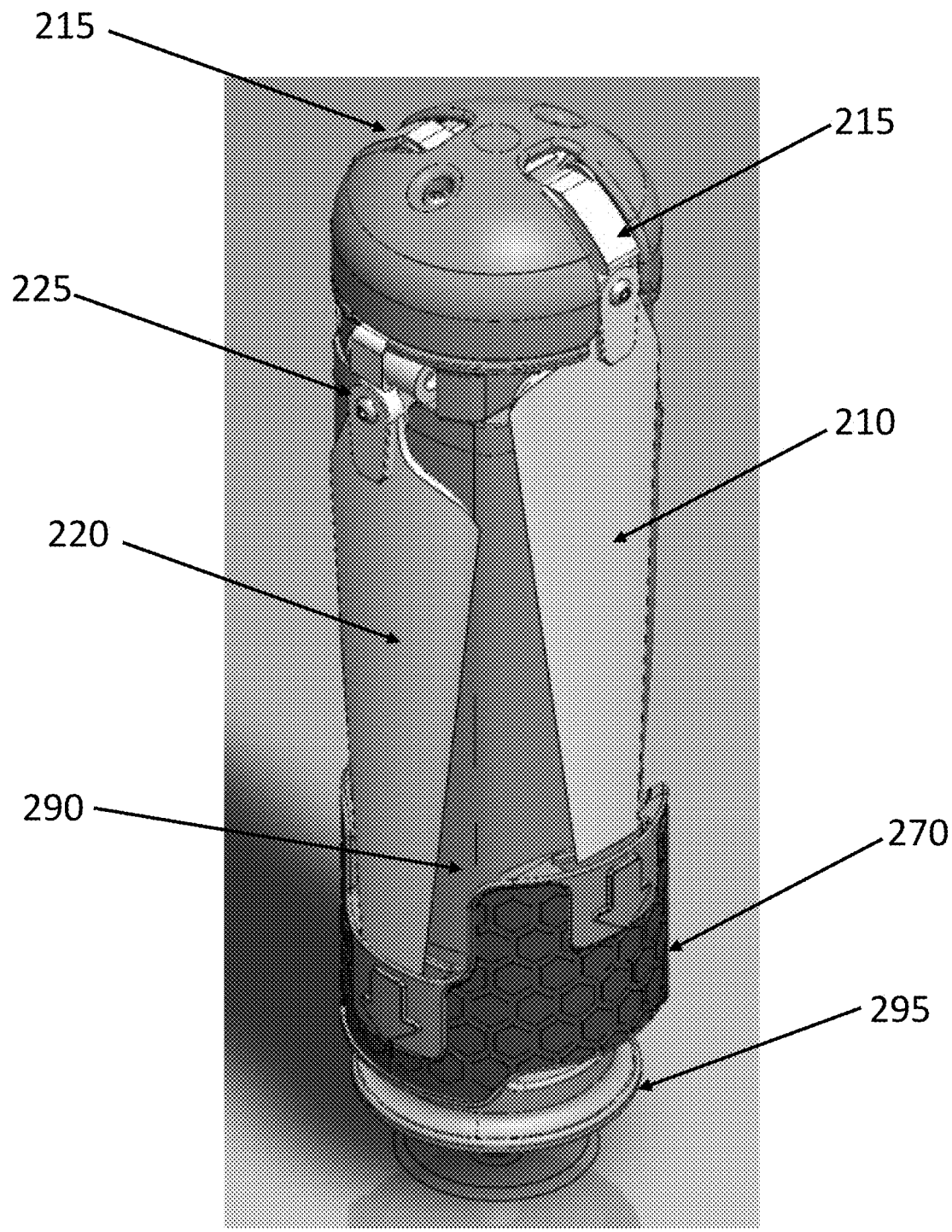
FIG. 2 is an exemplary perspective view of an embodiment of the flight-enabled beacon in an inactive state with one or more sets of rotatable blades, or propellers, in a closed configuration.
Figure 3:
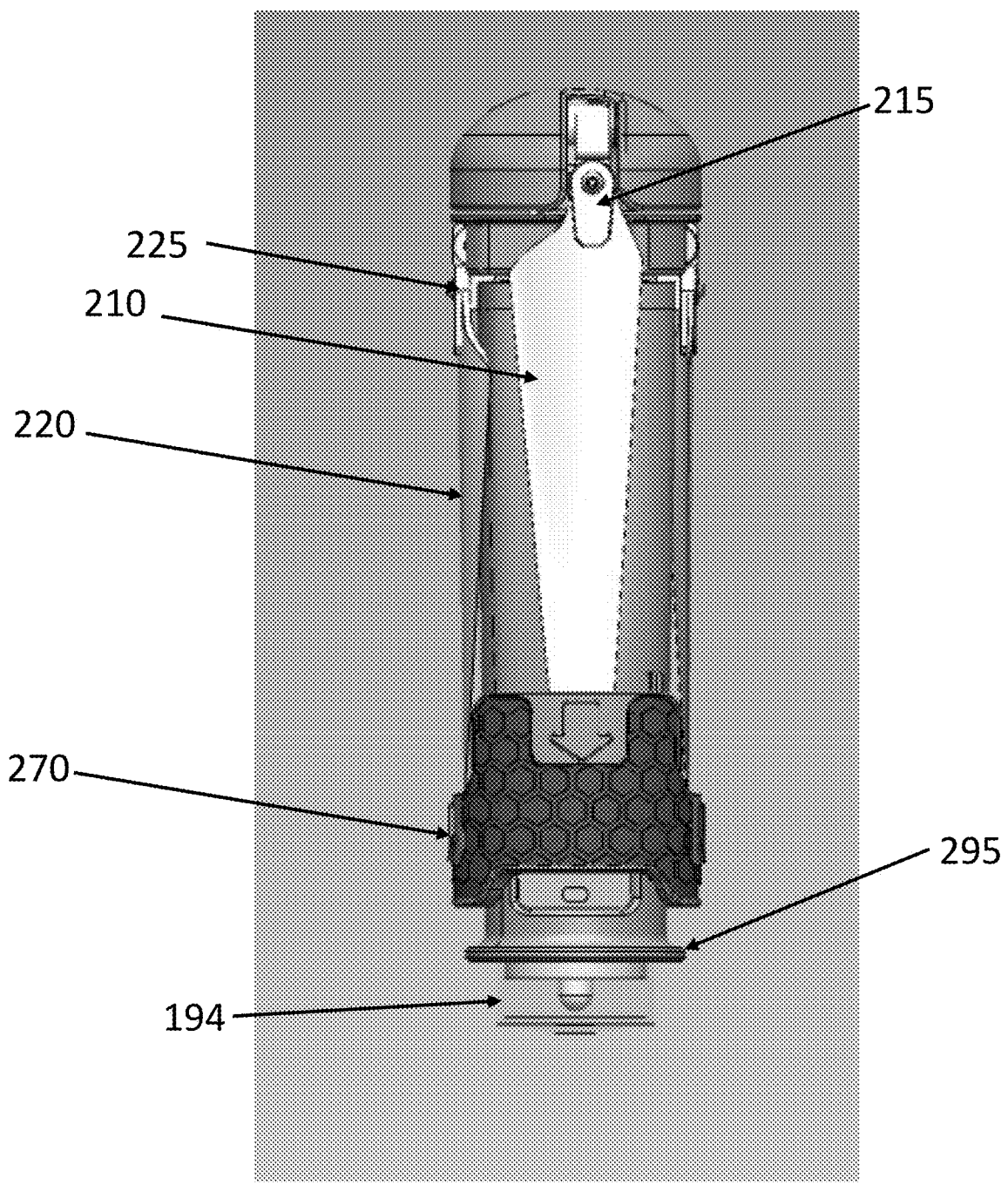
FIG. 3 is an exemplary perspective side view of an embodiment of the flight-enabled beacon in the inactive state with one or more sets of rotatable blades, or propellers, in the closed configuration.
Figure 4:
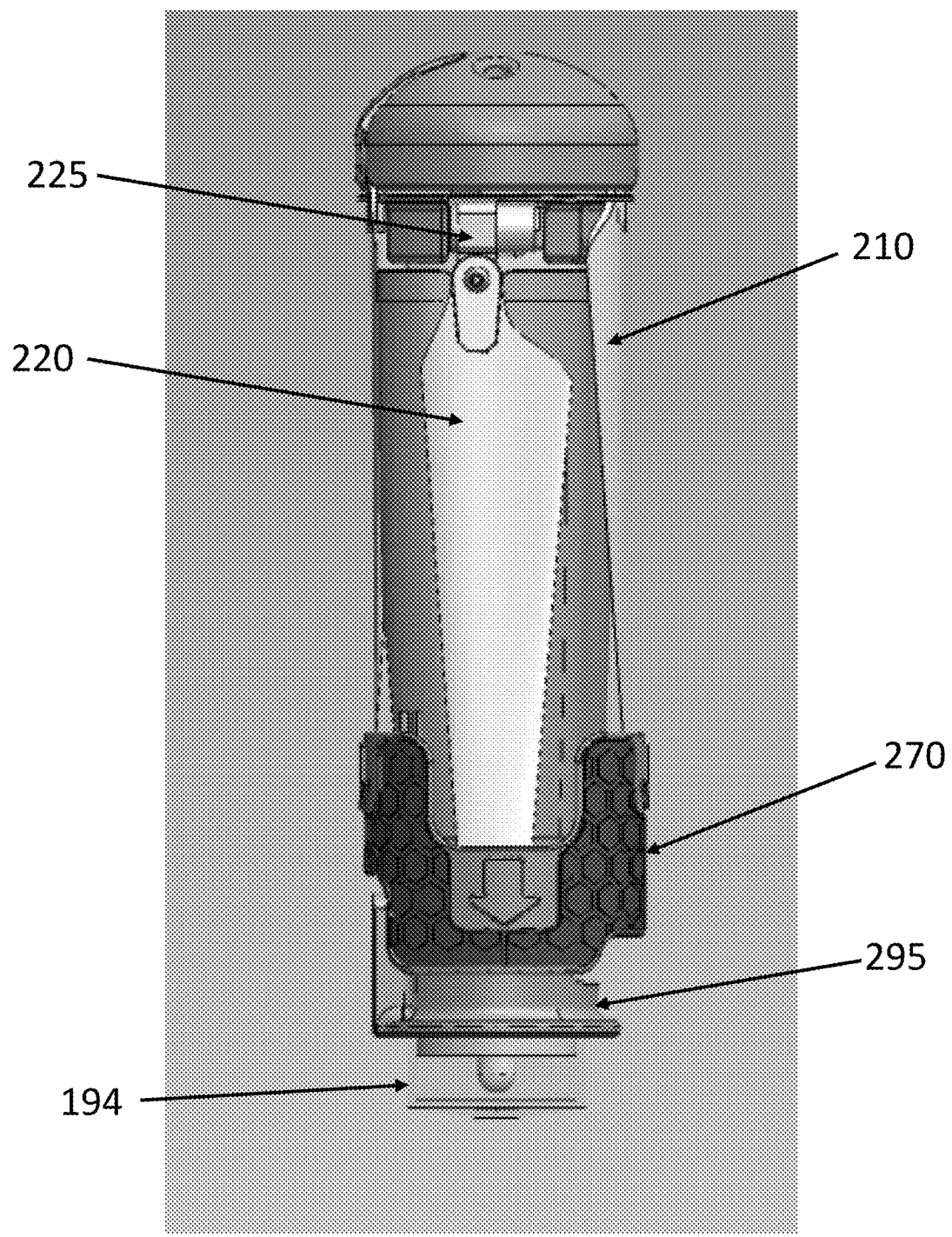
FIG. 4 is an exemplary perspective opposite side view of an embodiment of the flight-enabled beacon in the inactive state with one or more sets of rotatable blades, or propellers, in the closed configuration.
Figure 5:
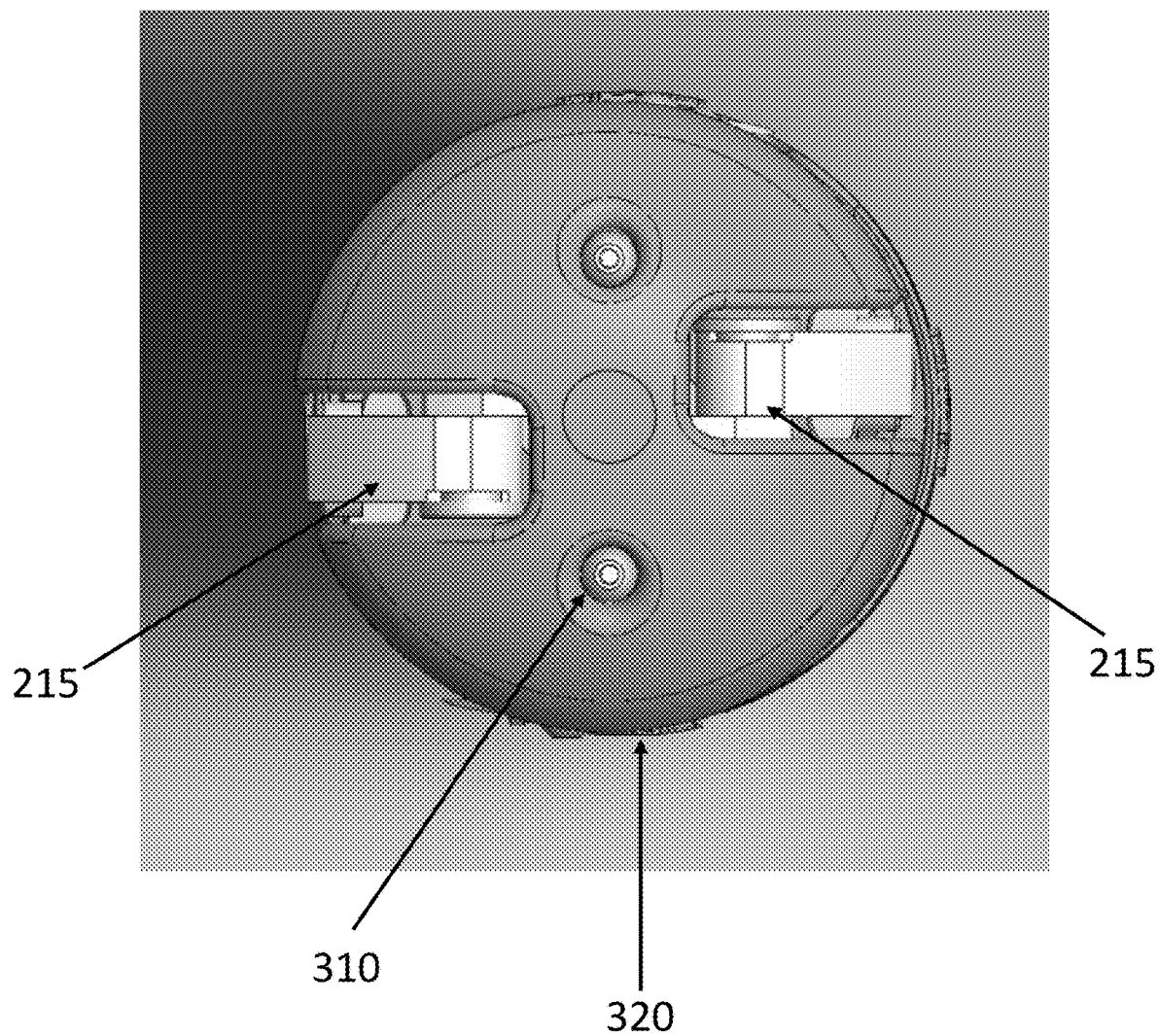
FIG. 5 is an exemplary perspective top view of an embodiment of the flight-enabled beacon in the inactive state with one or more sets of rotatable blades, or propellers, in the closed configuration.

The housing of the flight-enabled beacon (100), as shown in FIGS. 2-9, may be a tubular or cylindrical-shaped shaft, or shell, having an inner aperture for encapsulating the various components. The housing may also comprise a compatible cap (320, FIG. 5) with fasteners (310), such as screws or other watertight press-fit pieces, that couple to one end of the shaft (shown having a lengthwise axis (290) in FIG. 2), and a shaft terminus (295, FIG. 2) coupling to an opposite end of the shaft. In some embodiments, the housing can comprise one or more of a uniform geometric shape and a coaxial cross section. In some embodiments, the flight-enabled beacon (100) can be configured where the motors (110, 112) and the gimbals (240, 250) are positioned within the housing and a portion of the light emitting source (194) is positioned outside the housing. The housing can extend along the primary lengthwise axis (290), with a distal end rotatably coupled with the sets of rotatable blades (210, 220) as shown in FIGS. 2-4. In some embodiments, a proximal end can have the light emitting source (194) fixed thereon as shown in FIGS. 2-4. Additionally, or alternatively, the flight-enabled beacon (100) can comprise the shaft extending circumferentially about the axis (290) to enclose at least a portion of the body (shown in FIGS. 12-14) of the flight-enabled beacon (100).

The flight-enabled beacon (100) can be configured to have a small form factor, for example a length along the axis (290) within the range from approximately 6 to 10 inches, and a diameter about to the axis (290) within the range from approximately 1 to 3 inches.

The power source (190, FIG. 1) can be in electronic communication with, and configured to supply power to, the processor (125), the flight controller (130), the memory (135), the one or more motors (110, 112), the one or more gimbals (240, 250), the light emitting source (194), the camera (180), and any additional components attached to or in electronic communication with the flight controller (130) of the flight-enabled beacon (100). In some embodiments, the power source (190) is positioned inside the housing of the flight-enabled beacon (100). The power source (190) can be coupled to a power-disconnect switch to terminate power to one or more of: the processor (125), the memory (135), the one or more motors (110, 112), the one or more gimbals (240, 250), or the light emitting source (194). The power source (190) can comprise a rechargeable power source or a non-rechargeable power source. In some embodiments, the power source (190) comprises one or more LiPo batteries. In embodiments, the flight-enabled beacon (100) may comprise an electronic speed control (ESC) (105) and battery (190), the ESC (105) can convert DC battery power into 3-phase AC power for driving the one or more motors (110, 112). In some embodiments, the flight-enabled beacon (100) includes two or more power sources, one for flight and one for the light emitting source (194), for example.

The flight-enabled beacon (100) can be configured with the set of rotatable blades (210, 220) in the closed configuration (FIGS. 2-6) and the closed configuration (FIGS. 7-10) and mediated by the latch mechanism (270). More specifically, a first position of the latch mechanism (270) is configured to hold the one or more sets of rotatable blades (210, 220) in the closed, or deactivated, configuration; and a second position of the latch mechanism (270) is configured to release, or activate, the one or more sets of rotatable blades (210, 220) from the closed configuration to the open, or activated or deployed, configuration. In some embodiments, the first set of rotatable blades (210) and the second set of rotatable blades (210) are parallel to the flight-enabled beacon (100) in the closed configuration (FIGS. 2-6). In additional or alternative embodiments, the first set of rotatable blades (210) and the second set of rotatable blades (220) are perpendicular to the flight-enabled beacon (100) in the open, or deployed. configuration (FIGS. 7-10). The latch mechanism (270) can be positioned on the outside surface of the housing and may extend over an outer circumference of the housing of the flight-enabled beacon (100).

As shown in FIGS. 2-10, the latch mechanism (270) can comprise an annular ring. The annular ring can extend circumferentially about the shaft housing, and is configured to have an inner surface of the ring in contact with the distal, or outer, edges of one or both of the sets of rotatable blades (210, 220) that hold the rotatable blades (210, 220) in the closed configuration, as shown in FIGS. 2-6. Additionally, or alternatively, the latch mechanism (270) can be rotatable circumferentially around the housing. In such embodiments, the latch mechanism (270) configured as the annular ring defines grooves spaced along the inner surface such that when the latch mechanism (270) is rotated either clockwise or counter clockwise, the distal, or outer, edges of one or more of the sets of rotatable blades (210, 220) align with the grooves and the sets of rotatable blades (210, 220) are thus free to move from the closed configuration to the open configuration. Further, the latch mechanism (270), configured as the annular ring, for example, can be movable in a proximal direction along the axis (290) of the housing such that the inner surface of the latch mechanism (270) is no longer in contact with the distal, or outer, edges of the one or more sets of rotatable blades (210, 220) and the rotatable blades (210, 220) are thus free to move from the closed configuration (FIGS. 2-6) to the open configuration, as shown in FIGS. 7-10. In a further example, the latch mechanism (270), configured as the annular ring, can be movable in the proximal direction along the axis (290) of the housing such that the inner surface of the latch mechanism (270) is no longer in contact with the distal, or outer, edge of the first set of rotatable blades (210), thereby allowing them to move from the closed configuration to the open configuration, and subsequently, the latch mechanism (270) is rotated, either clockwise or counterclockwise, such that the distal, or outer, edges of the second set of rotatable blades (220) is aligned with the grooves, thereby allowing them to move from the closed configuration to the open configuration. It will be appreciated that other compatible latch mechanism shapes, sizes, and activation ways may be incorporated depending upon the design and shape of the housing.

In any of the preceding embodiments, the flight-enabled beacon (100) may optionally comprise a flotation unit. The flotation unit can be in electronic communication with one or more of the processor (125) and the memory (135) coupled with the processor (125) of the flight-enabled beacon (100), and configured to trigger a flotation mechanism associated with the flight-enabled beacon (100) based at least in part on sensor information from a sensor associated with the flight-enabled beacon (100). In some embodiments, the light emitting source (194, FIG. 1, 330, FIG. 8) is further configured to emit light when the flotation unit triggers the flotation mechanism. Additionally, or alternatively, the flotation unit can comprise a floatable material or baffles, air pockets or other means of sustaining the flight-enabled beacon (100) above water The camera (180, FIG. 1) or other image sensor can be in electronic communication with one or more of the processor (125) and the memory (135) coupled with the processor (125) of the flight-enabled beacon (100), and configured to perform object localization and tracking. One or more of the orientation or the direction of the flight-enabled beacon (100) is based at least in part on the object localization and tracking of an object based on image data collected from the camera (180). In some embodiments, the flight-enabled beacon (100) is configured to transmit one or more images of an environment or surrounding area near the user to a user device (e.g., cellular phone, electronic display, etc.) to help the user navigate from a current position to a second position (e.g., from an unsafe position to a safe position). In some embodiments, the flight-enabled beacon (100) may automatically hold a position and altitude or the user may direct the position and altitude of the flight-enabled beacon (100) using the user device (e.g., cellular phone).

The flight-enabled beacon (100) can further comprise, optionally, the transceiver (160). The transceiver (160) can comprise an automatic identification system (AIS). The transceiver (160) can be in electronic communication with one or more of the processors (125) and the memory (135) coupled with the processor (125) of the flight-enabled beacon (100), and is configured to operate according to one or more communication protocols. In some embodiments, the transceiver (160) is positioned inside the housing of the flight-enabled beacon (100).

The flight-enabled beacon (100) can further comprise, optionally, the GPS Module (170). The GPS module (170) may include magnetometer sensors that are in electronic communication with one or more of the processors (125) and the memory (135) coupled with the processor (125) of the flight-enabled beacon (100). The GPS module (170) is configured to provide latitude, longitude, elevation, and compass headings.

The flight-enabled beacon (100) can further comprise the inertial measurement unit (IMU, 140) in electronic communication with one or more of the processor (125) and the memory (135) coupled with the processor (125). The IMU (140) is configured to estimate position information of the flight-enabled beacon (100). In some embodiments, the IMU (140) is positioned inside the housing of the flight-enabled beacon (100). The IMU (140) can comprise 3-axis or 6-axis detection. In some embodiments comprising 6-axis, detection can include the combination of 3D gyroscopic and 3D accelerometer information allowing the 6-axis gyroscope to measure the amount of static acceleration due to gravity and also the amount of dynamic acceleration. The IMU (140) comprises inertial sensors to detect changes in rotational attributes of one or more blades (210, 220), like pitch, roll and yaw (FIG. 11), using one or more gyroscopes.

The flight-enabled beacon (100) can further comprise, optionally, an audio unit (not shown) in electronic communication with one or more of: the processor (125) and the memory (135) coupled with the processor (125). The audio unit comprising a speaker is configured to broadcast audio information, for example, at the target altitude and over the temporal period.

The flight-enabled beacon (100) can further comprise, optionally, the safety unit (not shown) in electronic communication with one or more of the processor (125) and the memory (135) coupled with the processor (125). The safety unit is configured to trigger a parachute, for example, associated with the flight-enabled beacon (100) based at least in part on a power level of the power source (190) associated with the flight-enabled beacon (100). In some embodiments, the parachute is housed inside the housing of the flight-enabled beacon (100) until deployment.

The flight-enabled beacon (100) can further comprise, optionally, a base (not shown), for example a tripod, one or more legs, or other structure that causes the light-enabled beacon (100) to stand on a surface unassisted by a user. In such embodiments, the drone (100) may be launched from the base to fly to the target or pre-determined altitude, as described elsewhere herein.

Figure 17:
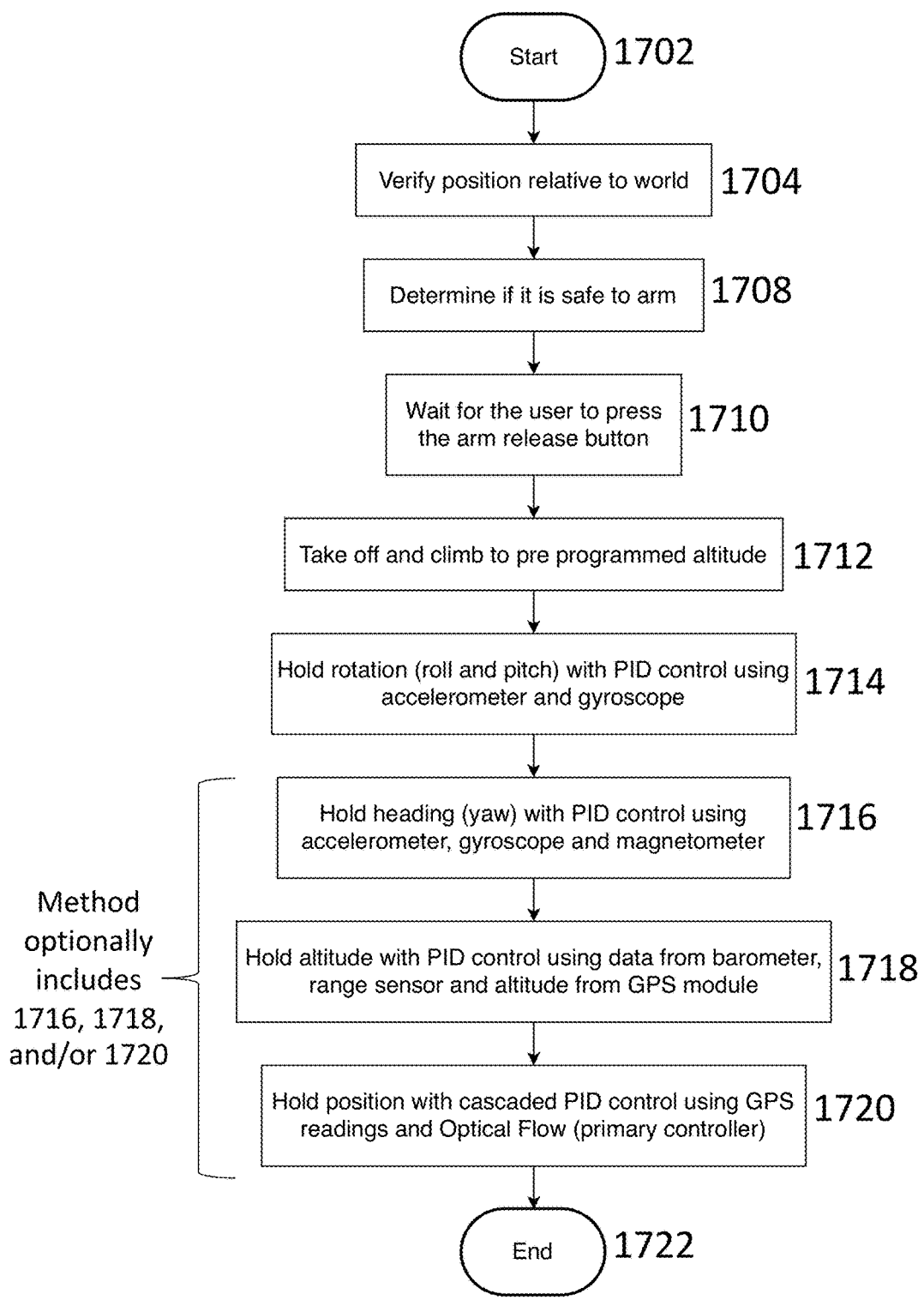
FIG. 17 is an exemplary embodiment of a method for activating and deploying the flight-enabled beacon.

FIG. 17 is an exemplary embodiment of a method for activating and deploying the flight-enabled beacon (100). At block 1702, the flight-enabled beacon (100) is positioned at a launch point. The flight-enabled beacon (100) determines and verifies the global position, or coordinates, of the launch point of the flight-enabled beacon (100) using the GPS module (170) (e.g., a system capable of assessing the coordinates of the flight-enabled beacon (100) relative to the rest of the globe) at block 1704, and, at block 1708, determines whether it is safe to arm the flight-enabled beacon (100). In other words, the flight-enabled beacon (100) determines whether it is safe to activate and release the sets of rotatable blades (210, 220) and begin an upward flight by analyzing all received various sensor data and the x and y location from the verified launch point. For example, if one or more sensors detect movement or an object in close proximity to the flight-enabled beacon, activation and release may be delayed until the object or movement is no longer detected or at least detected at a safe distance relative to the rotatable blades. In block 1710, the flight-enabled beacon (100) waits for an activation, or deployment, signal, such as the repositioning of the latch (270) or a received activation transmission from an external device. Upon receiving the activation signal at block 1712, the sets of rotatable blades (210, 220) are moved from the closed configuration, as shown in FIGS. 2-6, to the open configuration, as shown in FIGS. 7-10; the flight controller (130) activates the one or more motors (110, 112) that controls the rotor rotation control (120) and correspondingly rotating the sets of rotatable blades (210, 220), and the flight-enabled beacon (100) begins ascending to the pre-programmed or target altitude in block 1712.

As the flight-enabled beacon (100) ascends and reaches the target altitude above the launch point, the flight-enabled beacon (100) may have one or more internal flight programs. In one embodiment, a flight program may hold the rotation (i.e., roll and pitch) of the flight-enabled beacon (100). At block 1714, the flight controller (130) monitors and adjusts the parameters controlling the rotation of the flight-enabled beacon (100) using the command loop program, which receives and compares the actual x and y coordinates to the target x and y coordinates relative to the launch point. The flight controller (130) may use a controller, such as a proportional-integral-derivate (PID) controller that executes the command loop program using inputs from the GPS (170), an accelerometer and/or gyroscope. For example, the flight program may instruct, for example, maintaining the flight-enabled beacon (100) at a pitch angle from approximately between 0 and 25 degrees. In another embodiment, at block 1716, the flight program may instruct, for example, holding the flight-enabled beacon (100) at a desired heading (i.e., yaw). The flight controller (130) using the command loop program and input data from the GPS (170), an accelerometer, gyroscope, and/or magnetometer compares the actual yaw rotation with the target yaw rotation relative to the launch point. In another embodiment, the flight program may instruct holding the altitude of the flight-enabled beacon (100), at block 1718. The flight controller (130) monitors and adjusts parameters controlling the ascending, or z-directional, flight in order to hold the altitude using the command loop program and inputs from a barometer, range sensor, and/or GPS coordinates. The flight controller (130) monitors and adjusts the parameters using the command loop program, which receives and compares the actual z coordinate to the target z coordinate relative to the launch point and continually adjusts the parameter to reach and maintain the target altitude. For example, in some embodiments, the flight controller (130) executing the flight program instructs the one or more sets of rotating blades (210, 220) to rotate and ascend to the target altitude, for example, ranging approximately from 125 to 175 ft, acquire its coordinates from the GPS (170), and hold the flight-enabled beacon (100) at that altitude for a period of time, for example, ranging approximately from 5 minutes to 15 minutes. In another embodiment, at block 1720, the flight controller (130) may hold its position using a cascade control system with an optical flow sensor based primary controller and a feedback control loop and inputs from GPS readings. It will be appreciated, that one or two or more of the flight programs shown at blocks 1714-1720 may be performed in any combination, in any order, and/or optionally included or excluded. The flight-enabled beacon (100) continues the flight program until it lands or runs out of battery at block 1722.

Figure 18:
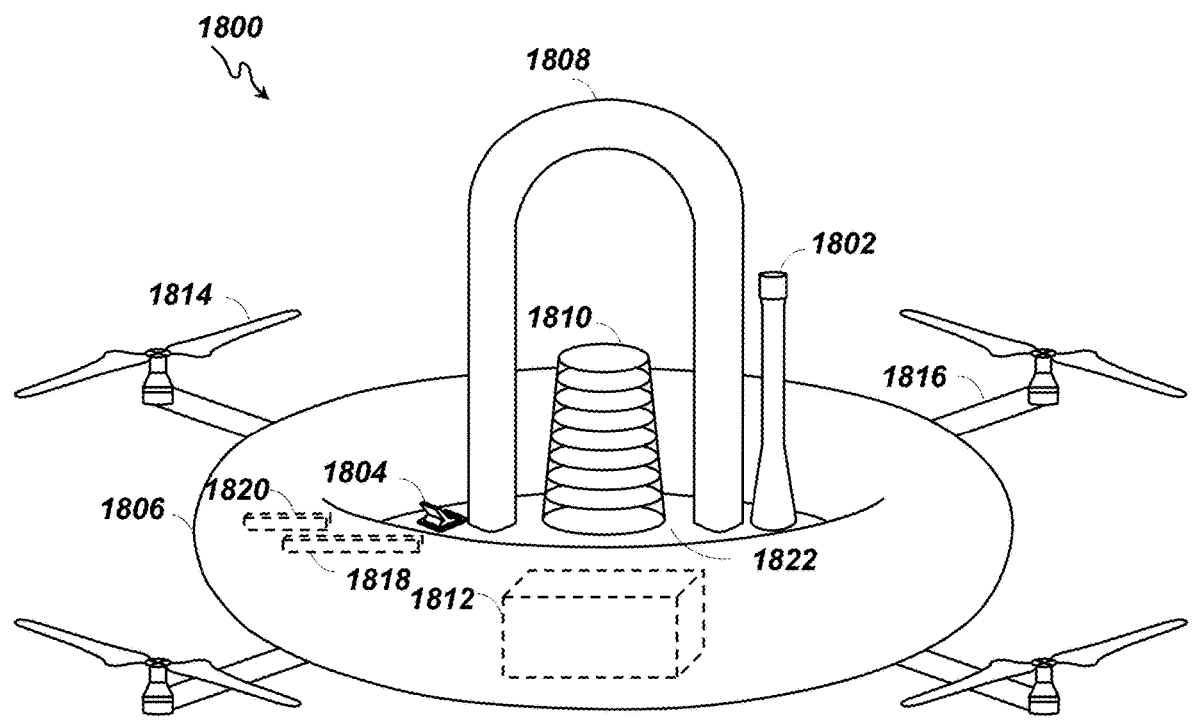
FIG. 18 is an exemplary embodiment of the flight-enabled beacon configured as a floatable search and rescue (SAR) drone.

In some embodiments, as shown in FIG. 18, the flight-enabled beacon (100) is configured as a search a rescue (SAR) drone. The SAR drone 1800 includes a floating body 1806. The drone 1800 is waterproof and capable of floating upright for a minimum of approximately ten hours. In some embodiments, the floating body 1806 can house the power source 1812, such as one or more batteries, as well as a processor 1818 and coupled memory 1820. A sealable access panel (not shown) can be used to provide service access to the power source 1812 as well as the processor 1818 and memory 1820. The floating body 1806 can include a center platform 1822 upon which various components can be mounted. The floating body 1806 can include a connector for coupling the power source 1812 to a connector of a charging cradle described below.

The SAR drone 1800 can include a lifting ring, hook, or other comparable lifting or hoisting mechanism, 1808 that can be formed from metal, composite material, and/or plastic. In some embodiments, the lifting ring 1808 can include a loop attached to the drone body 1806 that is tall enough to allow a standard recreational boat hook to engage it to lift the drone 1800 from the water. The SAR drone 1800 can include a light emitting source 1810 (e.g., an LED), such as an ultra-bright, side-emitting diode strobe light. The light emitting source 1810 can flash a white strobe when the SAR drone 1800 is turned "ON" and include a smaller array of colored (e.g., red, green, or blue) side-emitting diodes that can flash periodically (e.g., every thirty seconds) when an "I'm okay" switch is activated on SAR drone caller. The power source 1812 can be, for example, a high-capacity, oversized, rechargeable lithium-ion battery.

Figure 19:
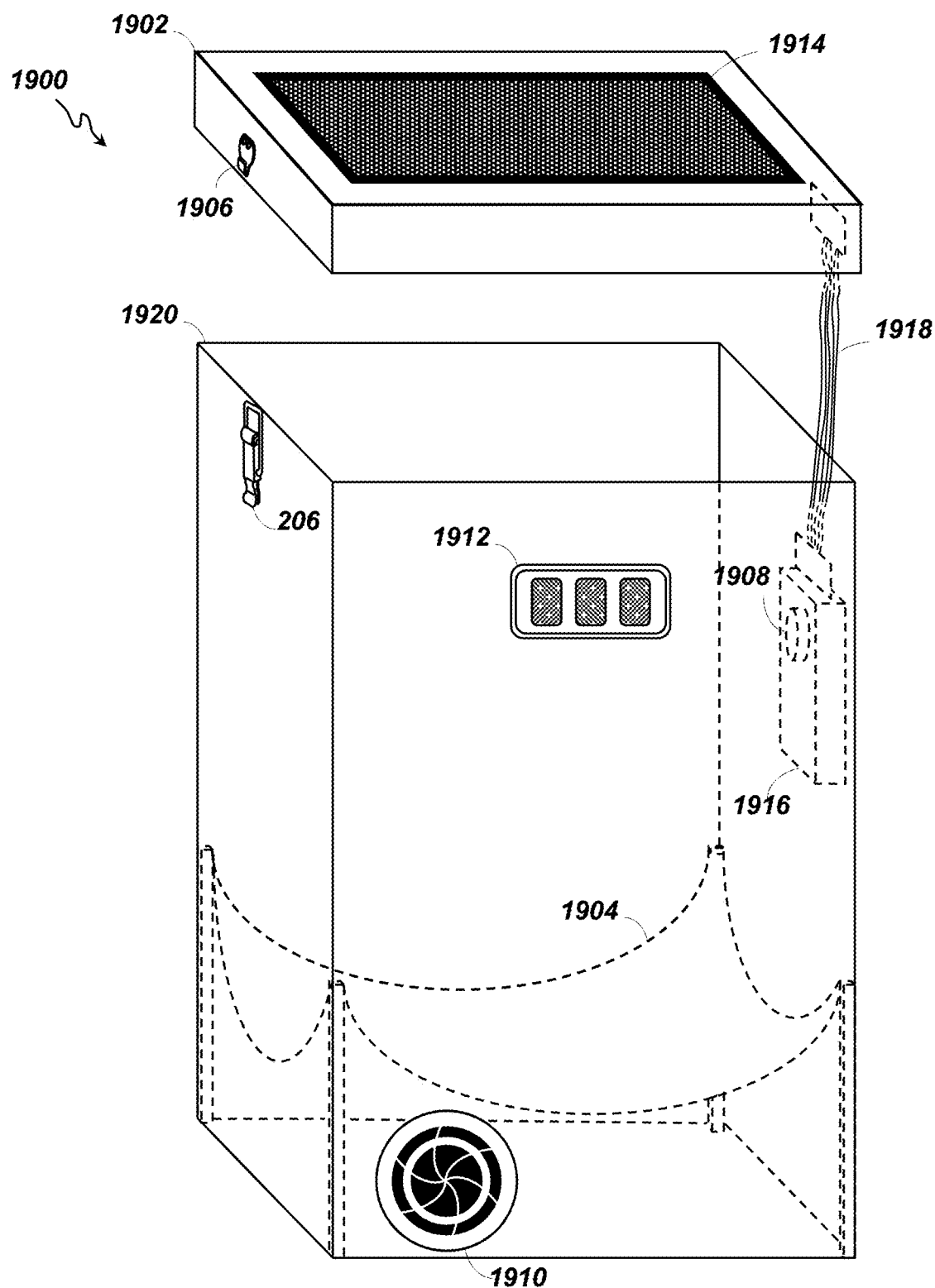
FIG. 19 is an exemplary embodiment of a SAR drone base.

Turning now to FIG. 19, an example embodiment of a SAR drone base 1900 is depicted. The base 1900 can include a lid 1902 and a housing 1920 both made of, for example, polyethylene, or other compatible material. The housing 1920 can be molded to accept and support the features shown in FIG. 19. Likewise, the lid 1902 can include a recess in the middle of the top surface to accept a solar panel 1914 and tabs to accept a tether with wiring 1918. The base 1900 can include a latch 1906 made from, for example, stainless-steel to securely hold the lid 1902 on the housing 1920.

The base 1900 can include a cradle 1904 (shown in phantom) within the housing 1920 for securely supporting the SAR drone 1800. The cradle 1904 can be made from molded polyethylene and can be positioned to provide room underneath for various circuitry such as a processor and memory, a signal transmission system, a charge controller, a drone spare battery, and/or back-up battery storage for the solar panel 1914. The cradle 1904 can include a connector for coupling the solar panel 1914 to the drone 1800 when the drone 1800 is docked in the cradle 1904.

The housing 1920 can include a recess for installation of a button 1908 (shown in phantom) for a SAR drone return signaler 1916. The button 1908 may activate transmission of a return signal to the transceiver, or AIS, (160, FIG. 1) housed within the SAR drone 1800 that will recall the SAR drone 1800. In some embodiments, the return signal overrides the SAR drone caller signal. The base 1900 can include an audible warning signal generator 1910, such as, for example, a klaxon, to indicate receipt of a call for help signal from a caller. The audible warning signal generator 1910 can include a loud (e.g., 90 dBA or more) waterproof buzzer or speaker that sounds when the SAR drone call for help signal is received before the SAR drone 1800 is removed from the SAR drone cradle 1904. In some embodiments, removing the drone 1800 from its cradle 1904 silences the audible warning signal generator 1910. In some embodiments, the audible warning signal generator 1910 can also serve as a speaker for broadcasting the compass course and bearing to the caller. The base 1900 can further include charger indicator lights 1912. For example, the charger indicator lights 1912 can include one or more LED lights that indicate the state of one or more of the power sources (1812, 140). In some embodiments, a red light can be used to indicate the power source (1812, 140) is charging, a green light can be used to indicate the power source (1812, 140) is fully charged, a blue light can be used to indicate the power source (1812, 140) is faulty and needs to be serviced/replaced, no light can be used to indicate that the drone 1800 is not in its cradle 1904, or is not properly locked/docked into its cradle 1904.

As indicated above, the base 1900 can include a solar panel 1914 for power-generation. The panel 1914 can be sized to fit into the recess in the lid 1902. The SAR drone return signaler 1916 can further include a charger/controller coupled to the solar panel 1914 to regulate charging of the battery 1812 (FIG. 18) and/or the power source (140) of the drone (100). The tether with wiring 1918 connects the solar panel 1914 to the charge controller 1916. The tether with wiring 1918 may include a strain relief to tether the lid 1902 to the housing 1920. The tether with wiring 1918 can be attached to lid 1902 and housing 1920 with fasteners such as, for example, 6 mm stainless steel bolts, washers and nylock nuts.

Figure 20:
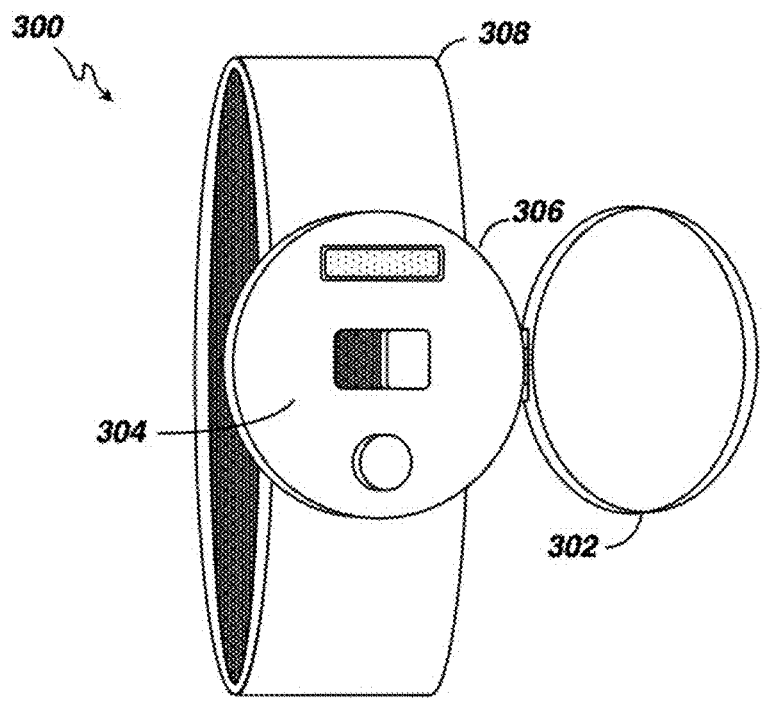
FIG. 20 is an exemplary embodiment of a SAR drone caller.
Figure 21:
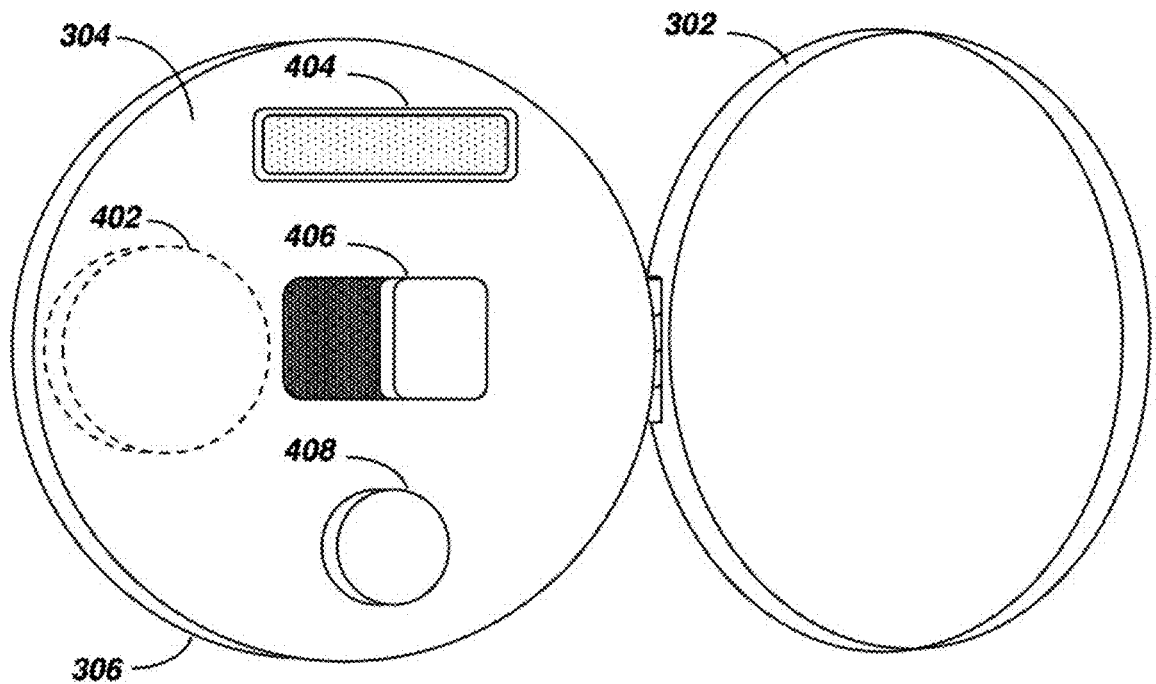
FIG. 21 is a magnified partial view of the SAR drone caller of FIG. 20.

Turning now to FIGS. 20 and 21 (a magnified partial view), an example embodiment of a SAR drone caller 300 is depicted. It should also be noted that drone caller 300 may also be used as a tracking or follow me device for the light-enabled beacon (100, 1800) described elsewhere herein. The caller 300 can be embodied as a wrist-worn (e.g., a wristwatch-like) device used to signal the transceiver (160) of the SAR drone 1800. The caller 300 can include a cover 302 that provides waterproof snap-fit protection for a switch panel 304. The cover 302 includes a positive-action lever to open for access to the switch panel 304. The caller 300 can include a body 306 that provides a waterproof, impact-resistant platform for the waterproof switch panel 304 with a removable waterproof access door (not shown) for battery insertion. The switch panel 304 can include waterproof switches and/or buttons 406 and 408 as well as waterproof indicator light 404. In some embodiments, the caller 300 can include a power source 402 (shown in phantom) such as, for example, one or more replaceable CR-2032 lithium "button" batteries or a rechargeable battery. In some embodiments, the indicator light 404 can be embodied as a small, green rectangular low-draw LED light that lights when SAR drone caller switch 406 is turned to "ON". The SAR drone caller switch 406 can be embodied as a single-pole, low-profile switch that activates a transmitter (not shown) within the caller 300 that summons the light-enabled beacon and/or SAR drone (100, 1800).

In some embodiments, the caller 300 can include an "I'm Okay" switch 408 embodied as a single-pole, low-profile switch mounted below the SAR drone call switch 406. The "I'm Okay" switch 408 can be narrower to further distinguish it from the wider SAR drone caller switch 406. The "I'm Okay" switch 408 is used to command the light emitting source 1810 on the SAR drone 1800 to flash a color and timing pattern (e.g., flash a red light every 30 seconds) to indicate the victim is conscious and responsive. In some embodiments, the caller 300 can include an EPIRB transmitter.

In some embodiments, the caller 300 can include a strap 308 embodied, for example, as a flexible rubber wrist strap incorporating retractable watch-like pins for attachment to the waterproof body 306 and a pivoting tang to secure the strap 308 in the correct diameter for a wide variety of wrist sizes. The strap 308 can include holes spaced, for example, every ¼" for easy adjustment.

Figure 22:
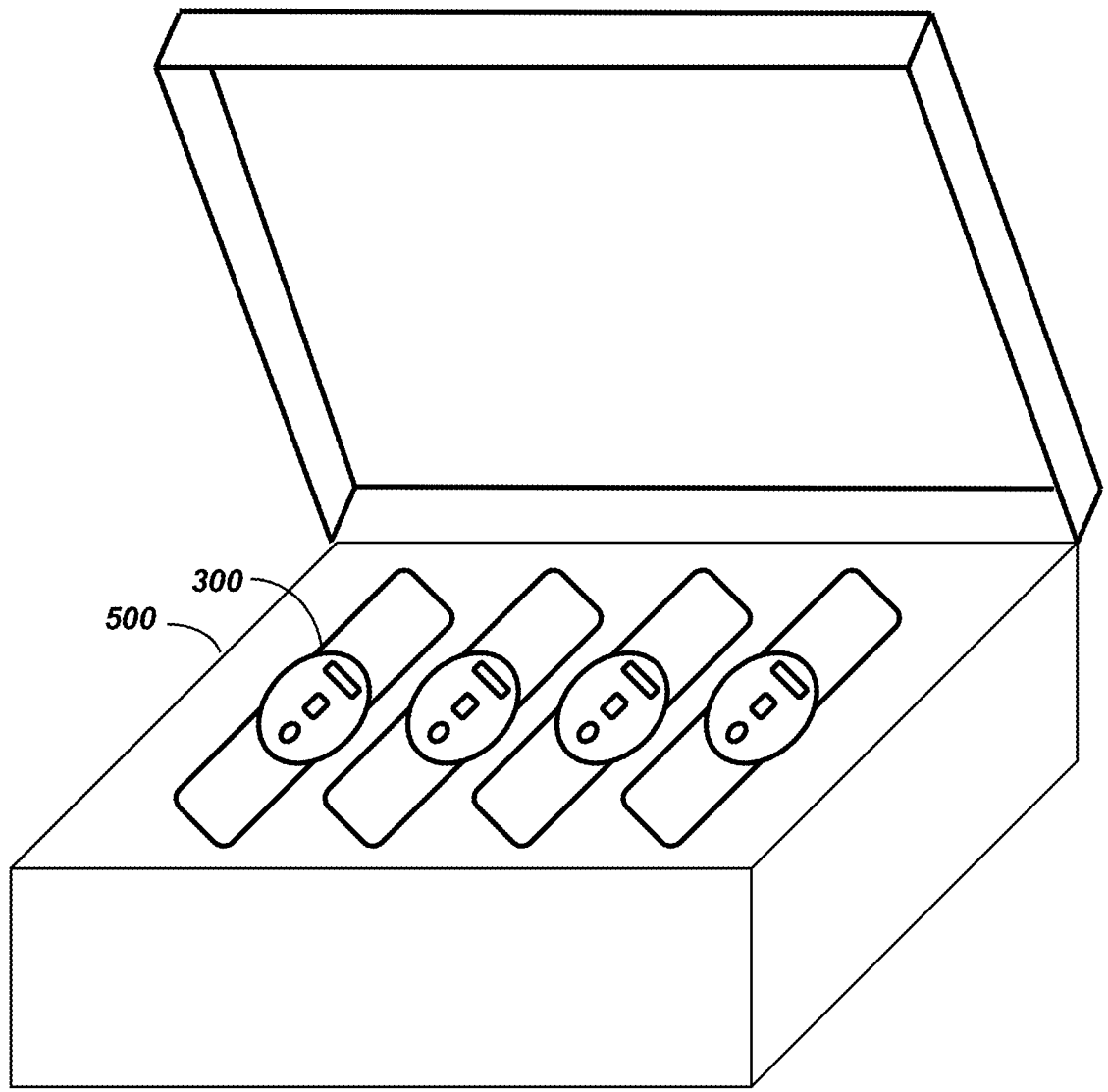
FIG. 22 depicts an exemplary embodiment of a caller garage.

FIG. 22 depicts an example embodiment of a caller garage 500 embodied as a protective case adapted to hold a set of SAR drone callers 300 on-board when not in use. Although four callers 300 are shown, it will be understood that the caller garage 500 can be sized to accommodate any desired number of callers 300.

Figure 23:
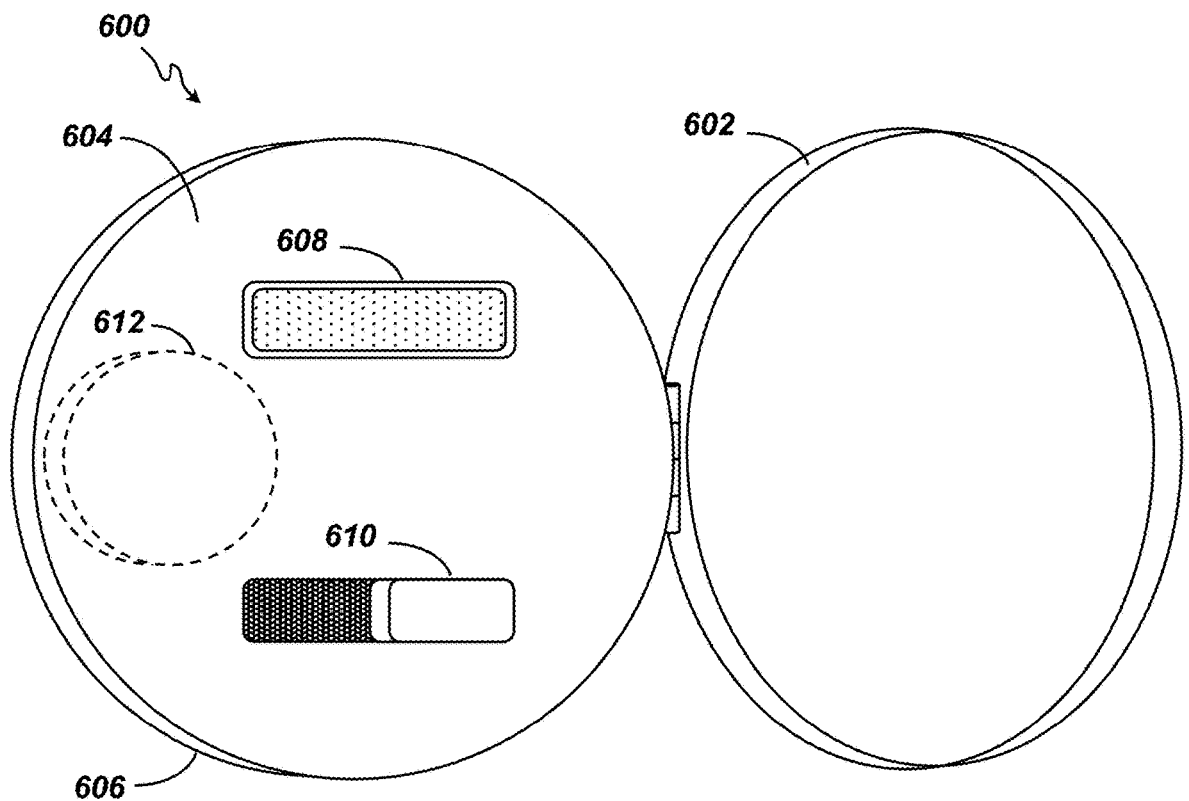
FIG. 23 depicts an exemplary embodiment of a land signaler.
Figure 24:
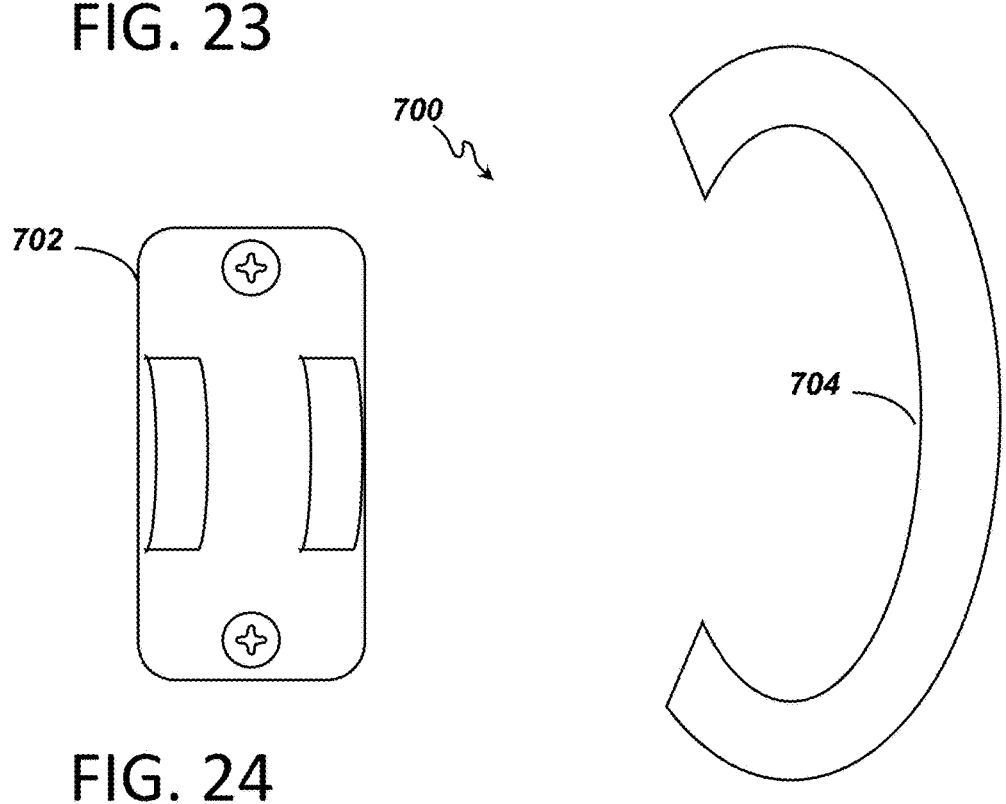
FIG. 24 depicts another embodiment of a land signaler.

FIGS. 23 and 24 depict an example embodiment of a land signaler 600. Embodiments of a land signaler 600 of the present invention can include an indicator light 608 implemented using, for example, a small, green rectangular low-draw LED light that lights when the SAR drone land command switch 610 is turned to "ON". The land signaler 600 can include a waterproof body 606 that is impact-resistant with a removable waterproof panel for battery insertion, and a waterproof fascia 604 containing the land command switch 610 and indicator light 608. The land command switch 610 can be a single-pole, low-profile switch that activates a transmitter within the land signaler 600 that transmits instructions to the transceiver (160) of the SAR drone 100 to land. The land signaler 600 can include a cover 602 that is a clear, waterproof, snap-fit sealing cover for protecting the fascia 604. The cover includes a positive-action lever to open for access to the land command switch 610. Within the land signaler 600 is a battery 612 than can include one or more replaceable lithium batteries such as, for example, CR-2032 lithium "button" batteries.

FIG. 24 depicts an example embodiment of a mounting system 700 for the land signaler 600. The land signaler 600 can be mounted horizontally or vertically using, for example, a 6" Velcro® strap 704 that can be fastened to the body 606 of the land signaler 600. Alternatively, the land signaler 600 can be permanently mounted with a screw-on dashboard mount 702 that accepts pins that insert into the body 606.

Figure 25:
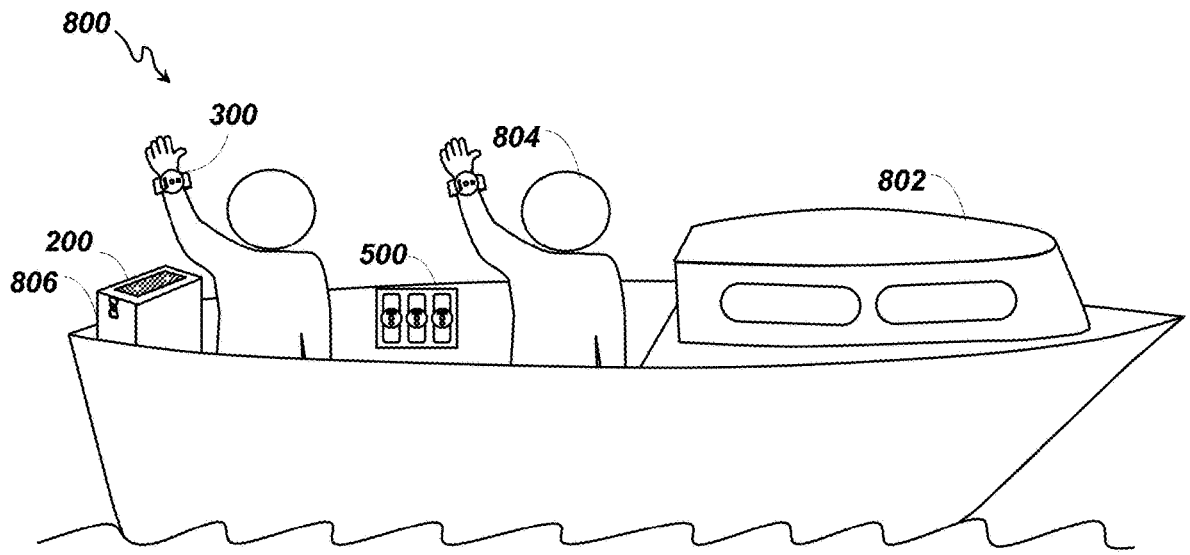
FIG. 25 depicts an exemplary embodiment of a mounting system for the land signaler of FIG. 23.
Figure 26:
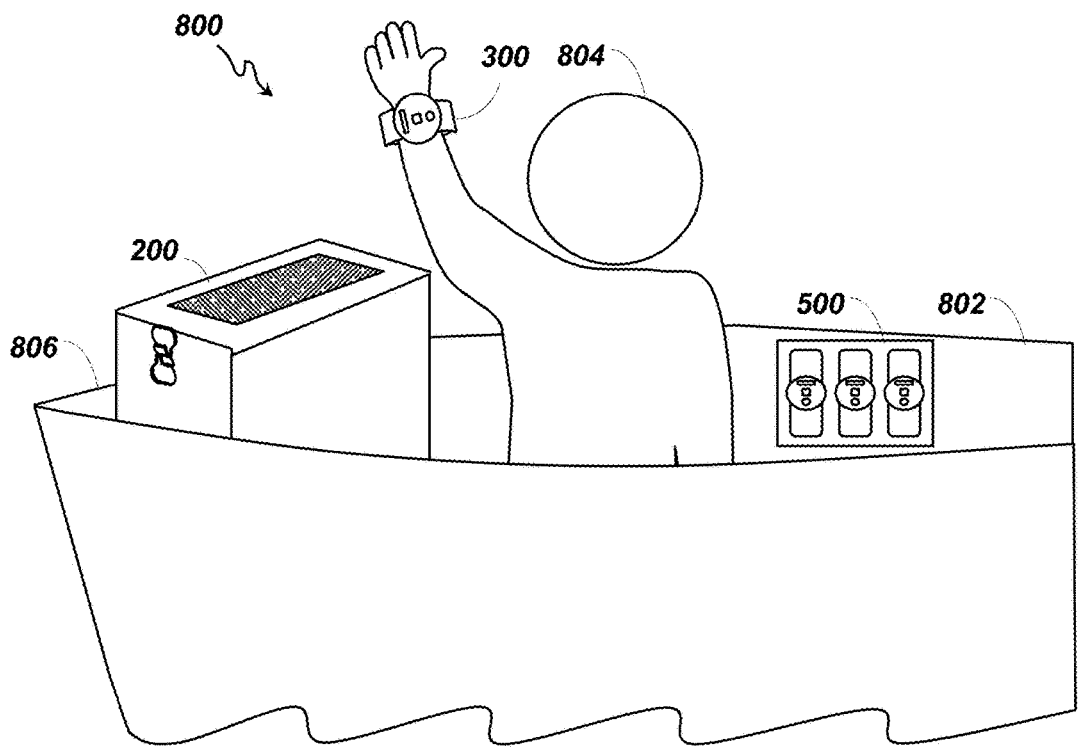
FIG. 26 depicts an exemplary embodiment of the SAR drone system mounted and ready for use on-board a boat.

FIGS. 25 and 26 depict an example embodiment of a SAR drone system 800 mounted and ready for use on-board a boat 802. FIG. 26 is a magnified view of a portion of FIG. 25. As shown, crew members 804 each wear a SAR drone caller 300 in case they fall over-board. Several spare callers 300 are stored in garage 500. The SAR drone base 1900 containing the SAR drone (not visible in FIGS. 25 and 26) is mounted to the stern rail 806 of the boat with included hardware.

Figure 27:
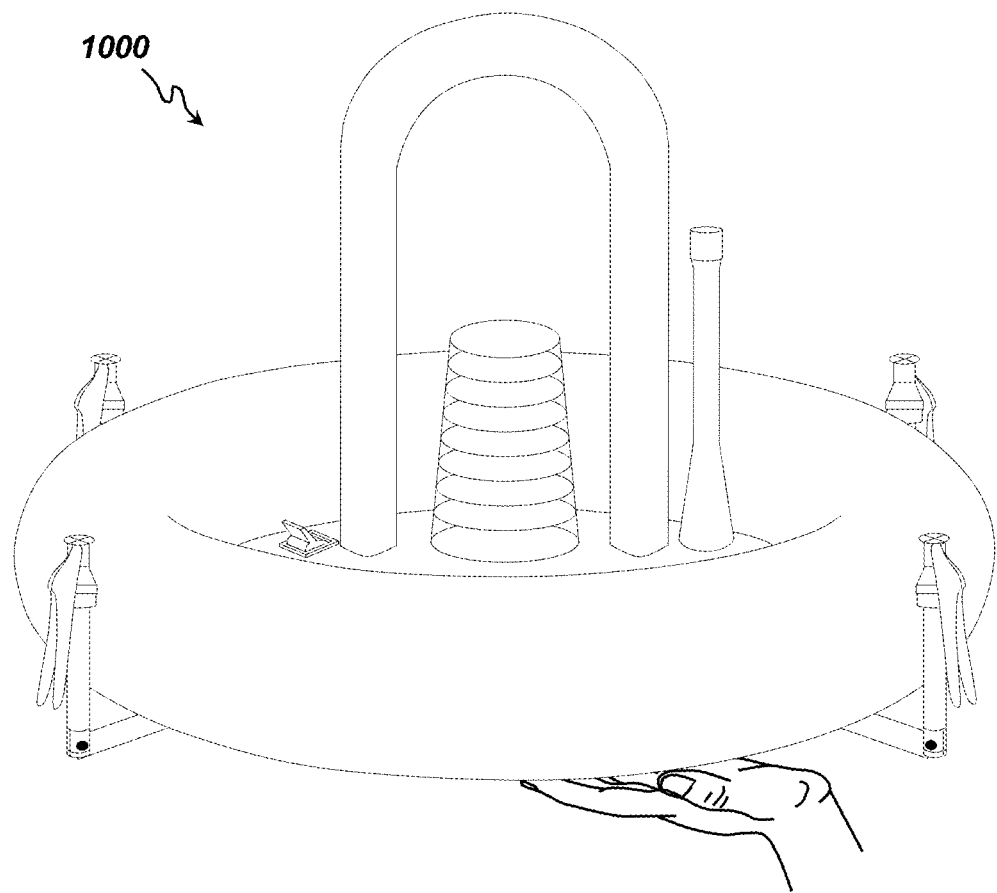
FIG. 27 is a magnified partial view of the SAR drone system of FIG. 26.
Figure 28:
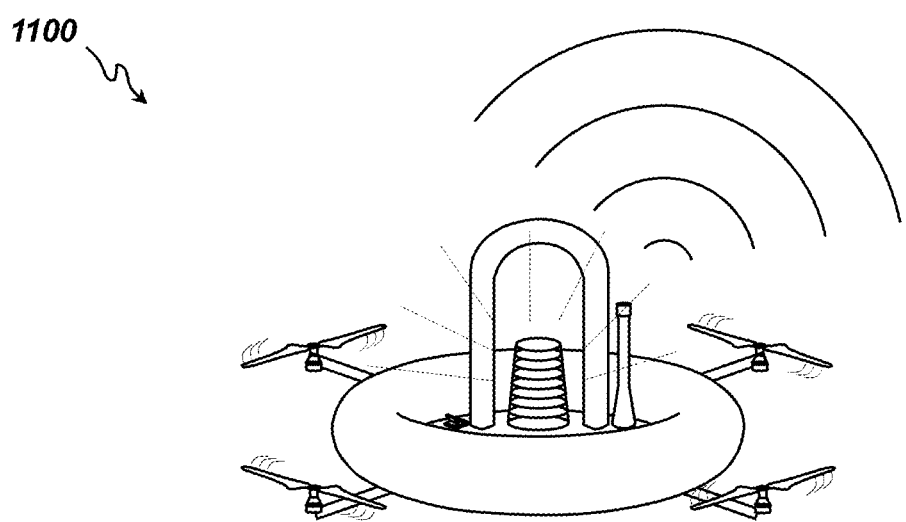
FIG. 28 depicts the SAR drone removed from the base and activated.

FIGS. 27 and 28 depict a method of hand-launching a SAR drone. FIG. 27 illustrates the SAR drone (1000) as stored in the base. The drone (100, 1000) is powered down and the rotors (1816, FIG. 18) are folded for compactness. FIG. 28 illustrates the SAR drone (1100) once the rotors (1816, FIG. 18) have been snapped into position, the strobe (1810) is flashing, the rotors (1816, FIG. 18) are spinning, and the signal transmission system is listening for a help call signal.

In more detail, the SAR drone 1100 is launched using the following example procedure. The stainless latch (206, FIG. 19) is released and this allows the lid (1902) to be removed from the base (1920), which can hang by the tether (1918). This allows the crew to access SAR drone (100, FIG. 1; 1800, FIG. 18; 1100, FIG. 28). Should SAR drone (100, 1800, 1100) help call be activated before the SAR drone is removed from the base (1920), the klaxon (1910) will sound. The klaxon (1910) will stop when the SAR drone (100, 1800, 1100) is removed from the base (1920). When the SAR drone is in the base, the four rotor arms (210, 220, FIG. 2; 1816, FIG. 18) are folded back, or in the closed configuration, such as shown in FIGS. 2 and 27, so that SAR drone may be fitted into the cradle within the base for charging. After a person goes overboard or the klaxon sounds, indicating that a person has activated the SAR drone help call, the SAR drone (100, 1800, 1100) is removed from the base and the crew unfolds the rotor arms into place. It will be appreciated that the SAR drone (100, 1800, 1100) may also move the rotor, or rotatable arms, into the open configuration automatically upon receiving an activation command, for example, by pressing a button or releasing a latch mechanism. Next, a power switch (1804, FIG. 18) is set to "ON", which turns on the rotors (210, 220, 1816), turns on the strobe (1810), and activates the emergency channel transmission system. With SAR drone (100, 1800, 1100) in flight mode (rotors turning), a crew member holds the drone in the palm of his hand and throws it skyward.

Figure 29:
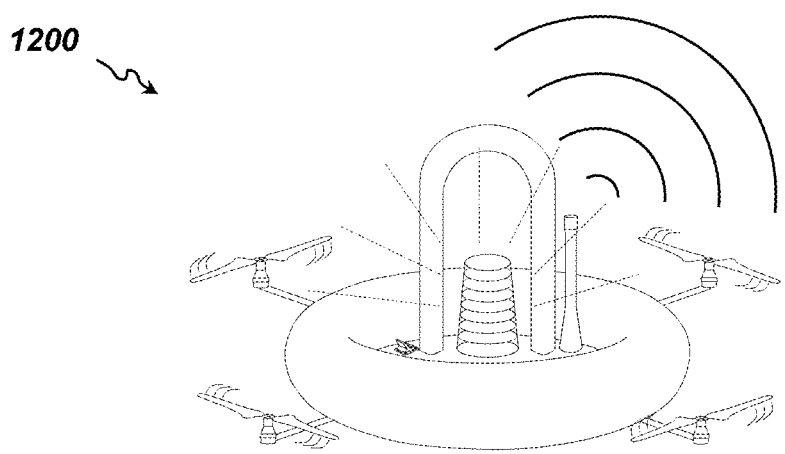
FIG. 29 depicts the SAR drone with the one or more sets of rotatable blades in the open configuration.
Figure 30:
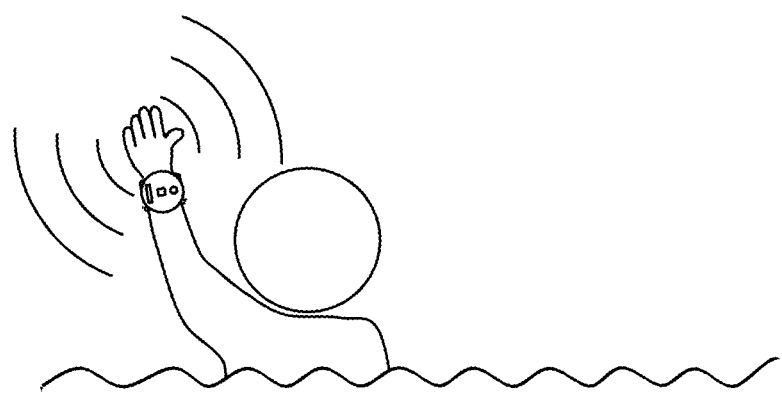
FIG. 30 depicts the SAR drone that may hover over a man-overboard wearing an activated SAR drone caller.

Turning now to FIGS. 29 and 30, details of a method of using the SAR drone in a search and rescue operation are illustrated. FIG. 29 depicts a SAR drone (1200) hovering over a "man overboard" (MOB) wearing an activated caller (300). After automatically launching or hand-launching the SAR drone (FIG. 29), the drone will fly at a predefined target altitude (e.g., 60 feet) over the water. The SAR drone (1200) is transmitting its own GPS location via VHF DSC, with the strobe (1810) flashing. The MOB snaps open the cover on the SAR drone caller (300) and turns the SAR drone help call switch (1804) to "ON". Once the SAR drone (1200) is on station above the MOB, the MOB can activate the "I'M OKAY" switch on the caller (300), which will signal the SAR drone (1200) to flash its strobe in a pattern indicating the victim is conscious and responsive (e.g., flash red light every thirty seconds).

Figure 31:
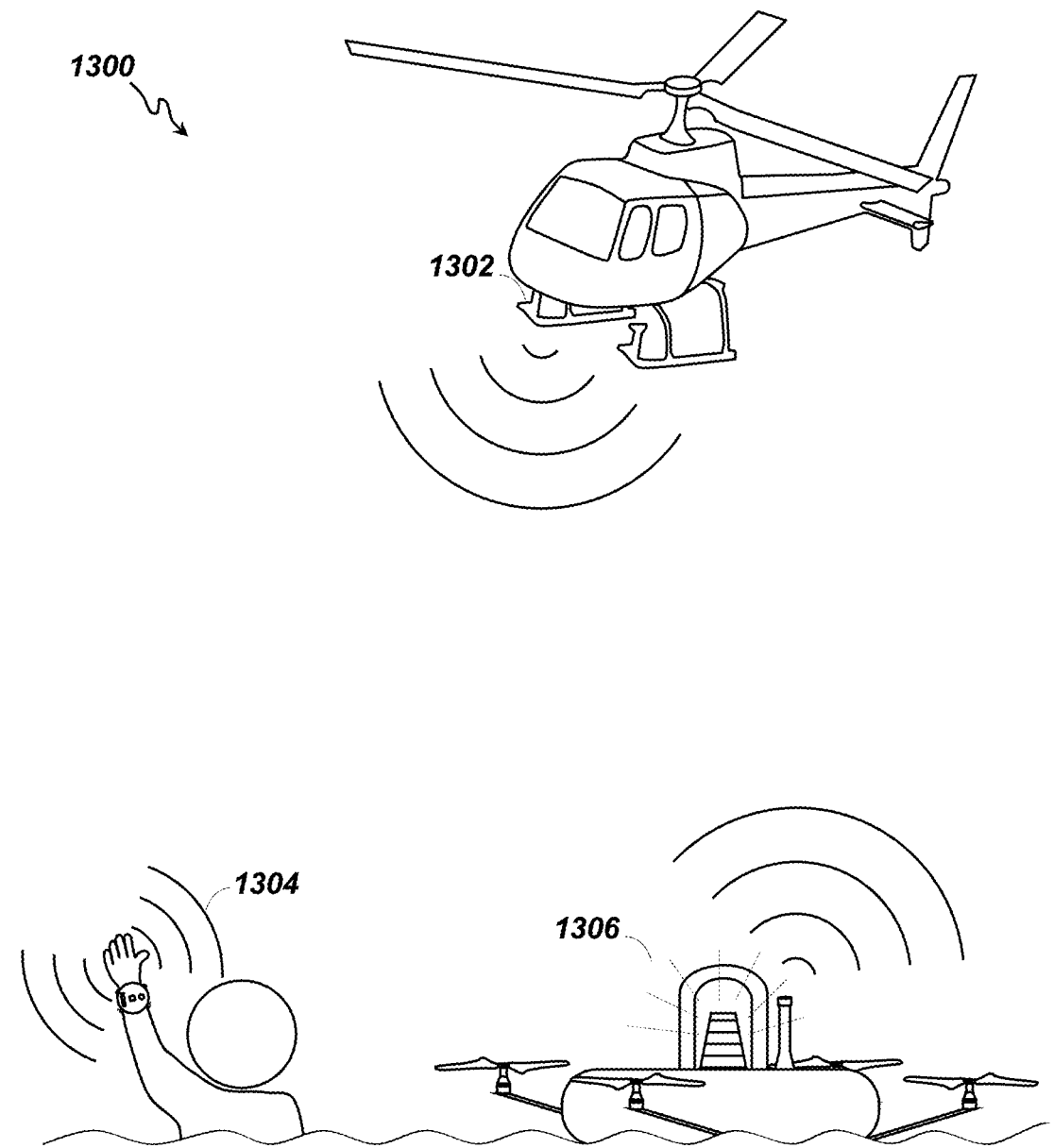
FIG. 31 depicts a broadcast from the activated SAR drone signaling a rescue helicopter.

As shown in FIG. 31, alerted by the VHF DSC broadcast from the SAR drone (100, 1200, 1800) and using the strobe (1810) as a visual guide, a rescue helicopter (1302) flies to the location that is broadcast by the transmitter of the SAR drone (1200). Once the helicopter pilot sees the SAR drone (1200) hovering over the MOB, a transmitter in the helicopter may transmit a command, or instructions, to the SAR drone indicating that a land function is activated by turning the land command switch of the land signaler to "ON". More specifically, the SAR drone (100, 1200, 1800) is configured with an antenna receiver (1802, FIG. 18) or transceiver (160, FIG. 1) for receiving a radio frequency signal from the rescue helicopter (1302) indicating the land command. The receiver provides the RF land command signal to the flight controller (130), which then controls the rotors (210, 220, 1816) and lands in the water, as shown as 1306 in FIG. 31. In this manner, the SAR drone (100, 1200, 1800) will not interfere with the helicopter, the rescue swimmer, and/or any recovery apparatus. Once the SAR drone land command signal is transmitted and/or triggered by the pilot using the land signaler, the SAR drone (100, 1200, 1800) lands in the water, keeping a pre-defined safety distance (e.g., 20 feet) from the source of the help call signal to avoid injury to the MOB. The SAR drone (100, 1200. 1800) will continue to flash its strobe (1810) and transmit its GPS location until its battery dies or it is recalled using the SAR drone return switch.

Figure 32:
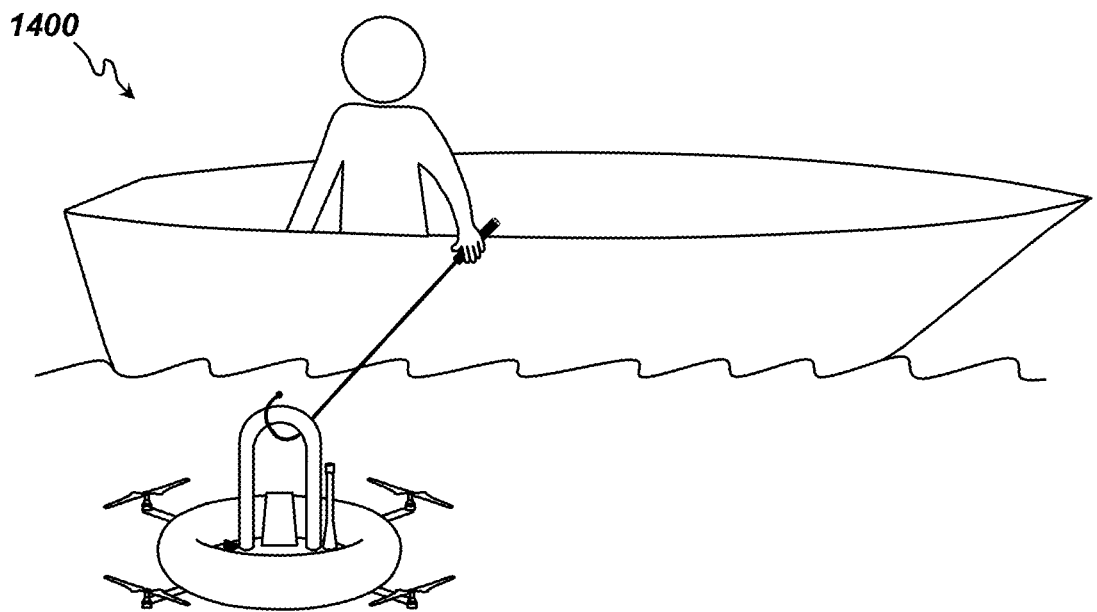
FIG. 32 depicts an exemplary method of retrieving the SAR drone from the water after receiving a return command.

FIG. 32 depicts an example method of retrieving the SAR drone (1200) from the water after a return command. Once the SAR drone (1200) has helped locate a victim, the SAR drone return button in the SAR drone base is communicatively activated. The SAR drone (1200) will take off from the water, fly back, and land near the base (e.g., 20' astern of SAR drone base). A boat hook, as shown in FIG. 32, is then used to retrieve the SAR drone (1200).

In some embodiments, the SAR drone (1200, 1800) can operate in a practice mode. To run a practice session with the SAR drone (1200), the SAR drone caller (300) is attached to a floating device, the snap-open cover (302) of the caller is opened, the help call switch is set to "ON", and the floating device is put over-board. Next, the rotors of the SAR drone (1200) are snapped into place and the power switch on the drone is set to "PRACTICE". This will turn on the SAR drone's rotors (1816) and the strobe light (1810) but not the VHF DSC emergency transmission system. The SAR drone (1200, 1800) is then hand-launched. Since the SAR drone caller help switch has already been turned on and the SAR drone caller (300) has been deployed on the float, the SAR drone (1200, 1800) will fly to the location of the floating device. The land signaler is then used to command the SAR drone (1200, 1800) to land. Once the floating device has been "rescued", the SAR drone (1200, 1800) is recalled to the base using the return command signal by communicatively activating the return button in the base. The SAR drone (1200, 1800) flies back towards the base (1902) and lands in the water near (e.g., within 50 feet) the base (1902). A boat hook is used to retrieve the SAR drone (1200, 1800) from the water.

Figure 33:
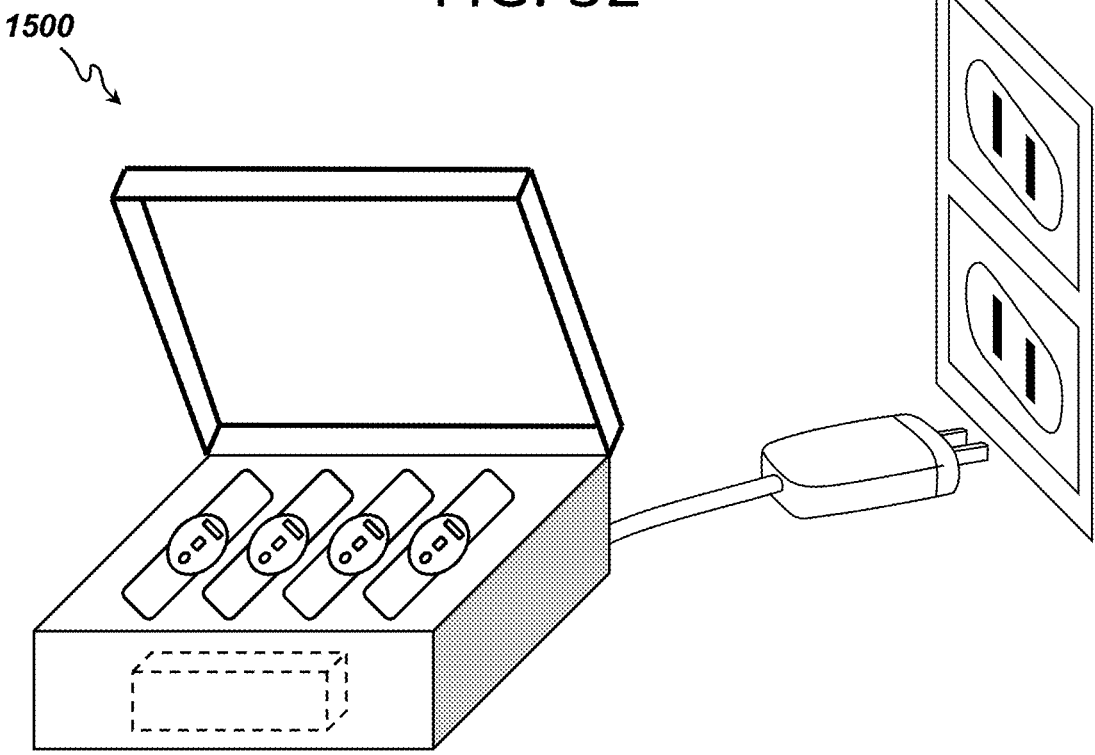
FIG. 33 depicts an exemplary embodiment of a rechargeable caller garage embodied as a protective case adapted to hold a set of SAR drone callers.

FIG. 33 depicts an example embodiment of a rechargeable caller garage 1500 embodied as a protective case adapted to hold a set of SAR drone callers (300*a-n*) powered by rechargeable batteries. When docked in the rechargeable caller garage 1500 the rechargeable callers (300*a-n*) are coupled to a charger (shown in phantom) within the case (1500) that can be powered by 12V ship's power or 110V/220V house power as shown. Although four rechargeable callers are shown, it will be understood that the caller garage 1500 and charger can be sized to accommodate any desired number of rechargeable callers.

Figure 34:
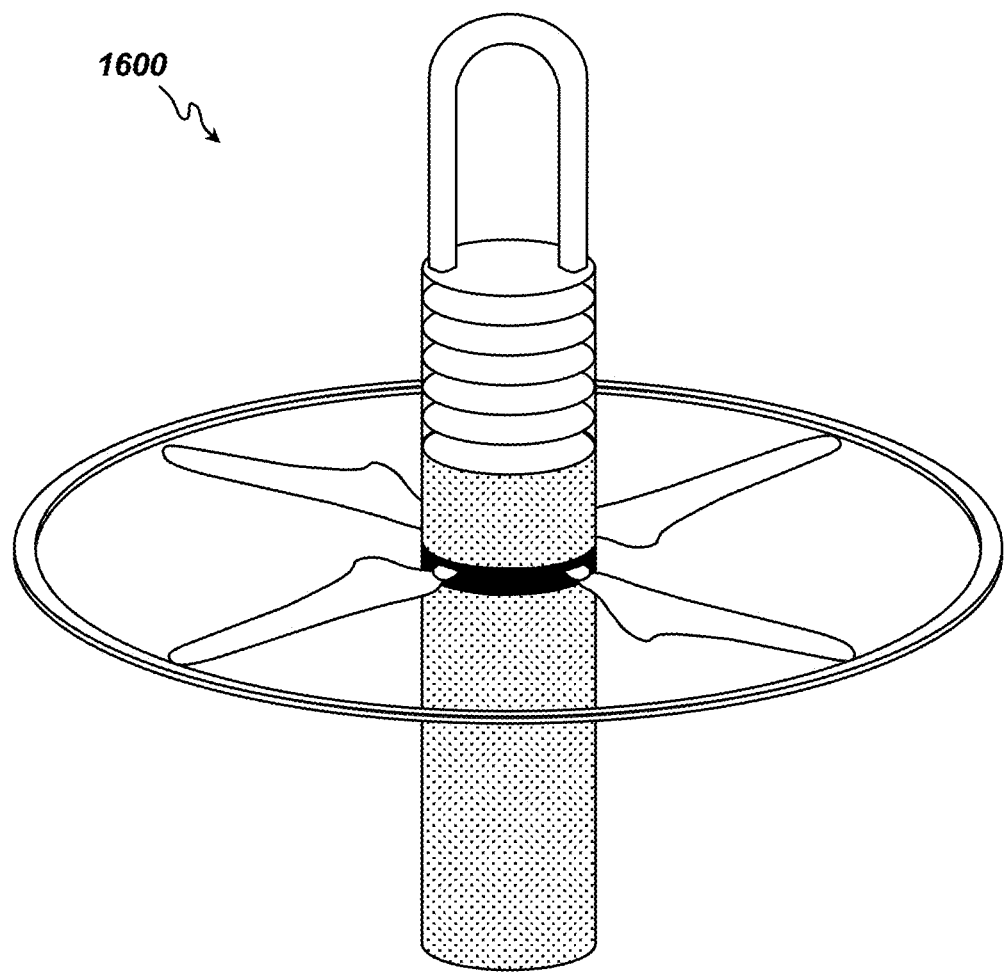
FIG. 34 depicts an alternative embodiment of the flight-enabled beacon, configured as a SAR drone.

FIG. 34 depicts an alternative example embodiment of a SAR drone 1600. The alternative SAR drone 1600 can be embodied as a single or multi-rotor cylindrically-shaped drone with similar features as the 4-rotor drone pictured in FIG. 18. The alternative SAR drone 1600 can include a strobe light with white and red diodes, a high-capacity battery, a GPS enhanced VHF/DSC location transmission capability, and be adapted to function in both practice and standard operating modes.

Figure 35:
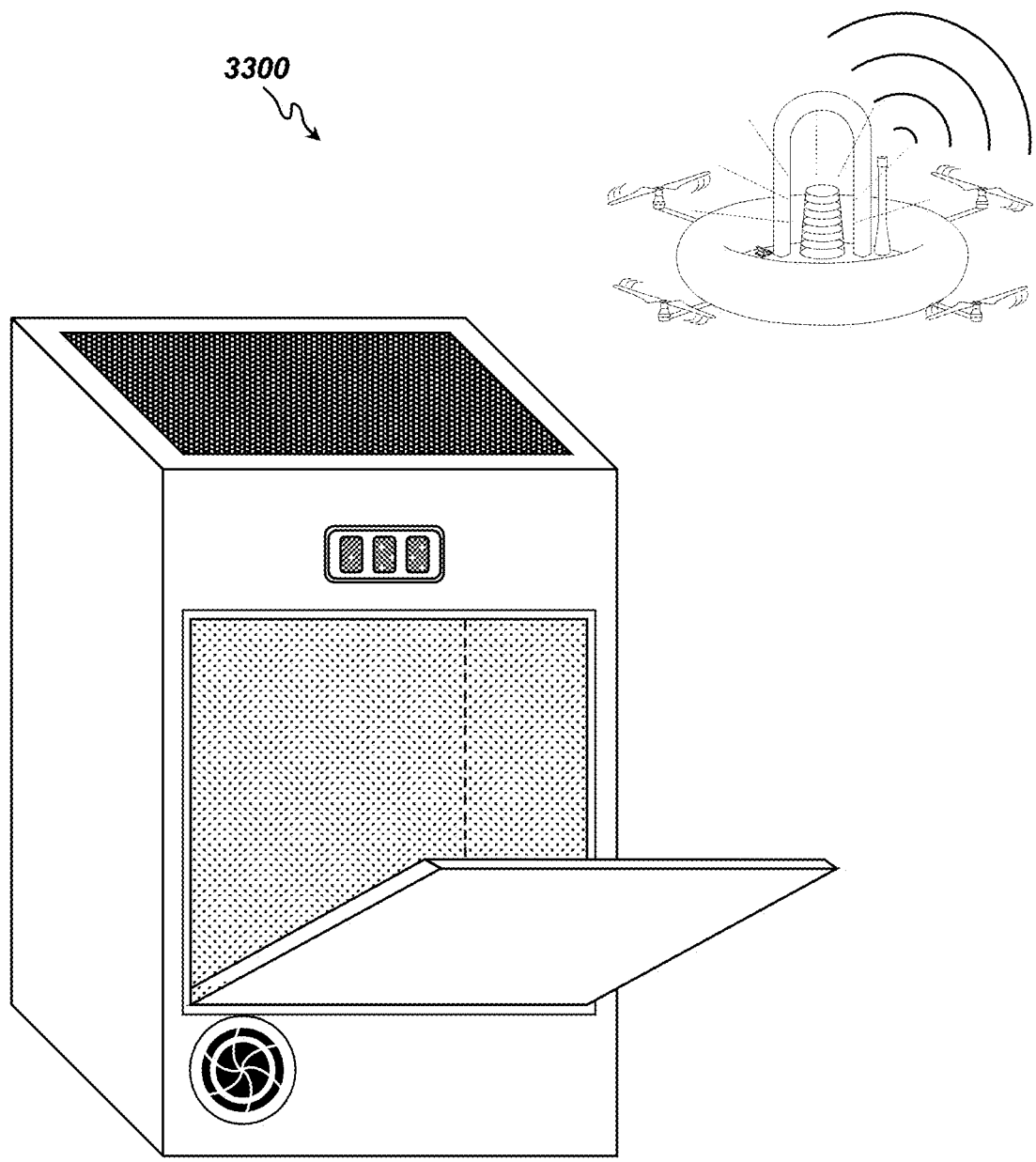
FIG. 35 depicts an alternative embodiment of a SAR drone system adapted for auto-deployment.

FIG. 35 depicts an alternative example embodiment of a SAR drone system (3300) adapted for auto-deployment. The alternative SAR drone system (3300) can automatically deploy a multi-rotor SAR drone from an alternative version of SAR drone base that opens on demand and launches the SAR drone. As shown, the alternative version of SAR drone base includes an actuated door (e.g., motorized, spring-loaded, etc.) that can open in response to the SAR drone receiving a help call signal. Likewise, the alternative SAR drone includes an electronic power switch that can be activated by a controller. In some embodiments, the housing can be large enough to accommodate rotors that are not foldable.

In some embodiments, the SAR drone (100, 1200, 1600, 1800) will include a performance profile defined by the maximum wind speed within which operations can be conducted, the average wind speed for normal operation, a minimum station time limit, a minimum beacon time limit, a minimum required float time, a worst case sea state for conducting operations, a worst case weather state for conducting operations, a minimum altitude requirement, a minimum time and/or distance from launch to victim requirement, and a minimum impact force/deceleration tolerance. An example of such a performance profile can require that the SAR drone can reliably fly and hover in 50 knot winds and tolerate up to 80 knot winds; tolerate 15 foot seas with spray and a period of 10 seconds; tolerate rain and lightning; provide 1 hour station time in air; provide 2 hour station time in water; provide multi-mile strobe reception; provide multi-mile wristband alarm; hover 100 feet above sea surface or victim; maintain an average flight speed in non-wind conditions of 50 knots or more; maintain a top flight speed in non-wind conditions of 80 knots or more; and have a recharging time of 5 hours or less. Other values for the performance profile can be used and it is expected that these examples will improve with improved drone/battery/communications/etc. technologies.

The systems and methods of the preferred embodiment and variations thereof can be embodied and/or implemented at least in part as a machine configured to receive a computer-readable medium storing computer-readable instruction. The instructions are preferably executed by computer-executable components preferably integrated with the system and one or more portions of the processor (125) on the light-enabled beacon. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

As used in the description and claims, the singular form "a", "an" and "the" include both singular and plural references unless the context clearly dictates otherwise. For example, the term "motor" may include, and is contemplated to include, a plurality of motors. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A portable flight-enabled beacon, comprising:
a housing;

a plurality of rotatable blades coupled to an exterior surface of the housing, wherein the plurality of rotatable blades are movable between an open configuration and a closed configuration, and wherein, upon activation of the flight-enabled beacon, the plurality of rotatable blades are configured to move to the open configuration;

one or more motors configured to operate the plurality of rotatable blades associated with the flight-enabled beacon;

a latch mechanism extending continuously around an outside surface of the housing, wherein the latch mechanism in a first position relative to the housing is configured to hold the plurality of rotatable blades in the closed configuration, and wherein the latch mechanism in a second position relative to the housing is configured to release the plurality of rotatable blades from the closed configuration to the open configuration;

wherein the latch mechanism is rotatable circumferentially around the housing, wherein the latch mechanism is configured to be rotatably adjusted between the first position of the latch mechanism and the second position of the latch mechanism;

a light emitting source configured to emit a light over a temporal period; and a processor in electronic communication with the one or more motors and coupled to a memory, the memory configured to store a command loop program to maintain a target altitude.

2. The portable flight-enabled beacon of claim 1, further comprising one or more gimbals in electronic communication with the processor and configured to receive signals according to one or more flight programs and the command loop program, wherein the memory is configured to store the one or more flight programs, and wherein the signals comprise parameters adjusting the plurality of rotatable blades, the parameters comprising one or more of: an orientation, a pitch angle, a yaw rotation, or a roll orientation of the flight-enabled beacon.

3. The portable flight-enabled beacon of claim 1, further comprising a flight controller unit positioned within the housing and in electronic communication with the processor, the one or more motors, the plurality of rotatable blades, and the light emitting source, the flight controller unit configured to receive a number of output commands and associated parameters from the processor in relation with a flight program and the command loop program, the command loop program configured to:

determine one or more of: an actual orientation or an actual altitude of the flight-enabled beacon;

determine one or more of: a target orientation or the target altitude of the flight-enabled beacon; and provide an output command equivalent to a difference parameter between the determined actual orientation or the actual altitude and the target orientation or target altitude to the flight controller unit, wherein the flight controller unit commands the one or more motors to rotate the plurality of rotatable blades according to the difference parameter in order to maintain one or more of: the target orientation and the target altitude and, absent an input from the flight controller, to hold one or more of: the target orientation and the target altitude.

4. The portable flight-enabled beacon of claim 3, wherein the plurality of rotatable blades comprise:

a first subset of rotatable blades configured to rotate in a first direction, wherein the first subset of rotatable blades comprises at least two rotatable blades; and a second subset of rotatable blades configured to rotate in a second direction different from the first direction, wherein the second subset of rotatable blades comprises at least two rotatable blades.

5. The portable flight-enabled beacon of claim 1, wherein the plurality of rotatable blades are configured to be parallel to the flight-enabled beacon in the closed configuration; and wherein the plurality of rotatable blades are configured to be perpendicular to the flight-enabled beacon in the open configuration.

6. The portable flight-enabled beacon of claim 1, wherein the housing is a tubular shaft for enclosing a body of the flight-enabled beacon; and wherein the latch mechanism extends around an outer circumference of the tubular shaft.

7. The portable flight-enabled beacon of claim 1, wherein the light emitting source comprises a light emitting diode configured to emit the light according to one or more of: an intensity, a direction, a color, or a rate.

8. The portable flight-enabled beacon of claim 1, further comprising:

a power source in electronic communication with, and configured to supply power to, one or more of: the processor, the memory, the one or more motors, or the light emitting source, wherein the power source is positioned inside the housing, and wherein the power source is coupled to a power disconnect switch to terminate power to one or more of: the processor, the memory, the one or more motors, or the light emitting source.

9. The portable flight-enabled beacon of claim 1, further comprising:

a camera in electronic communication with one or more of: the processor and the memory coupled with the processor, and configured to perform object localization and tracking, wherein one or more of: an orientation or a direction of the flight-enabled beacon is based at least in part on the object localization and tracking.

10. The portable flight-enabled beacon of claim 1, further comprising:

a transceiver enclosed in the housing, the transceiver in electronic communication with the processor and configured to operate according to one or more communication protocols and receive a plurality of commands from a number of different remote user devices, wherein the plurality of commands comprises one or more of: maintain altitude of the flight-enabled beacon; maintain roll of the flight-enabled beacon, maintain a yaw rotation of the flight-enabled beacon, maintain a pitch angle of the flight-enabled beacon; maneuver the flight-enabled beacon in a determined flight pattern, and land the flight-enabled beacon in a specified location.

11. The portable flight-enabled beacon of claim 1, further comprising:

an inertial measurement unit in electronic communication with one or more of the processor and the memory coupled with the processor, or configured to estimate position information of the flight-enabled beacon.

12. The portable flight-enabled beacon of claim 1, further comprising:

an audio unit in electronic communication with one or more of the processor and the memory coupled with the processor, or configured to broadcast audio information over the temporal period at one or more of: the target altitude, during ascension of the flight-enabled beacon, or after landing flight-enabled beacon.

13. The portable flight-enabled beacon of claim 1, wherein the latch mechanism further includes an annular ring extending circumferentially about the housing.

14. The portable flight-enabled of claim 1, wherein the latch mechanism is configured to be movably adjusted along an axis of the housing from the first position to the second position, or any point therebetween, wherein the second position of the latch mechanism is proximal to the first position.

15. A portable flight-enabled beacon, comprising:
a housing,
a plurality of rotatable blades movable between an open configuration and a closed configuration;
one or more motors configured to operate the plurality of rotatable blades;
a GPS module or a sensor;
a light emitting source configured to emit a light over a temporal period;
a processor communicatively coupled to a memory, the plurality of rotatable blades, and the one or more motors, wherein the processor is configured to:
receive, from the GPS module or the sensor, first coordinates indicative of a launch point;
receive an actuation signal based on a repositioning of the plurality of rotating blades from the closed configuration to the open configuration;
output an activation signal to the one or more motors electrically coupled to the plurality of rotating blades;
receive, from the GPS module or the sensor, second coordinates indicative of a target altitude;
activate the light emitting source; and
cause the flight-enabled beacon to maintain the target altitude for a period of time; and
a latch mechanism extending continuously around an outside surface of the housing, wherein the latch mechanism in a first position relative to the housing is configured to hold the plurality of rotatable blades in the closed configuration, and wherein the latch mechanism in a second position relative to the housing is configured to release the plurality of rotatable blades from the closed configuration to the open configuration;
wherein the latch mechanism is rotatable circumferentially around the housing, wherein the latch mechanism is configured to be rotatably adjusted between the first position of the latch mechanism and the second position of the latch mechanism.

16. The portable flight-enabled beacon of claim 15, wherein the plurality of rotatable blades is configured to be parallel to the flight-enabled beacon in the closed configuration; and wherein the plurality of rotatable blades is configured to be perpendicular to the flight-enabled beacon in the open configuration.

17. The portable flight-enabled beacon of claim 15, wherein the light emitting source comprises a light emitting diode configured to emit the light according to one or more of: an intensity, a direction, a color, or a rate.

18. The portable flight-enabled beacon of claim 15, further comprising:
a camera in electronic communication with one or more of: the processor and the memory coupled with the processor, and configured to perform object localization and tracking,
wherein one or more of: an orientation or a direction of the flight-enabled beacon is based at least in part on the object localization and tracking.

19. The portable flight-enabled beacon of claim 15, wherein the latch mechanism further includes an annular ring extending circumferentially about the housing.

20. The portable flight-enabled of claim 15, wherein the latch mechanism is configured to be movably adjusted along an axis of the housing from the first position to the second position, or any point therebetween, wherein the second position of the latch mechanism is proximal to the first position.

* * * * *